United States Patent
Bedford et al.

(10) Patent No.: US 9,865,066 B2
(45) Date of Patent: Jan. 9, 2018

(54) COMPUTED TOMOGRAPHY SYSTEM FOR CARGO AND TRANSPORTED CONTAINERS

(71) Applicant: Astrophysics Inc., City of Industry, CA (US)

(72) Inventors: Simon Peter Bedford, Poway, CA (US); Francois Zayek, Santa Ana, CA (US); Richard Hardwick Moore, Concord, MA (US); Fernando Quivira, Boston, MA (US)

(73) Assignee: Astrophysics Inc., City of Industry, CA (US)

( * ) Notice: Subject to any disclaimer, the term of this patent is extended or adjusted under 35 U.S.C. 154(b) by 161 days.

(21) Appl. No.: 14/695,038

(22) Filed: Apr. 23, 2015

(65) Prior Publication Data

US 2015/0325010 A1    Nov. 12, 2015

Related U.S. Application Data

(60) Provisional application No. 61/989,503, filed on May 6, 2014.

(51) Int. Cl.
*G06T 11/00* (2006.01)
*G01V 5/00* (2006.01)

(52) U.S. Cl.
CPC ............ *G06T 11/003* (2013.01); *G01V 5/005* (2013.01); *G01V 5/0016* (2013.01); *G01V 5/0066* (2013.01); *G06T 2211/416* (2013.01)

(58) Field of Classification Search
USPC ................................................ 378/57, 21, 4
See application file for complete search history.

(56) References Cited

U.S. PATENT DOCUMENTS

| | | | |
|---|---|---|---|
| 6,584,170 B2 * | 6/2003 | Aust | G01V 5/0016 378/57 |
| 7,062,011 B1 * | 6/2006 | Tybinkowski | G01N 23/046 378/57 |

(Continued)

FOREIGN PATENT DOCUMENTS

| | | |
|---|---|---|
| CN | 1242976 A | 2/2000 |
| CN | 1745296 A | 3/2006 |
| CN | 102099708 A | 6/2011 |

OTHER PUBLICATIONS

Communication with European Search Report for Application No. EP 15 16 6576, dated Oct. 5, 2015, 8 pages.

(Continued)

*Primary Examiner* — Kiet T Nguyen
(74) *Attorney, Agent, or Firm* — Lewis Roca Rothgerber Christie LLP

(57) ABSTRACT

An imaging system includes an x-ray or gamma ray source that emits an x-ray or gamma ray beam, a tunnel having a plurality of detectors, and a translatable platform. The detectors each receive a portion of the beam. The translatable platform supports cargo or a transported container and moves through the tunnel so that the cargo or transported container crosses the portions of the beam received by the detectors. The translatable platform may rotate and move through the tunnel at multiple angles. The imaging system may also include a computer and a graphical interface. The computer may receive information collected by the detectors and may reconstruct a three-dimensional image of the cargo or transported container. The graphical interface may display the three-dimensional image or information derived from the three-dimensional image. According to other embodiments, a system for creating a three-dimensional image may receive data from a wide vertical beam angle and generate and output a three-dimensional model.

19 Claims, 18 Drawing Sheets

(56) References Cited

U.S. PATENT DOCUMENTS

| | | | | |
|---|---|---|---|---|
| 7,860,211 B1* | 12/2010 | Annis | ............... | G01N 23/046 378/21 |
| 2004/0109532 A1 | 6/2004 | Ford et al. | | |
| 2008/0084962 A1* | 4/2008 | Zhang | ............... | G01N 23/046 378/57 |
| 2009/0285353 A1 | 11/2009 | Ellenbogen et al. | | |

OTHER PUBLICATIONS

Gao, H. et al. "Straight-Line-Trajectory-Based X-Ray Tomographic Imaging for Security Inspections: System Design, Image Reconstruction and Preliminary Results". IEEE Transactions on Nuclear Science, IEEE Service Center, New York, NY US, vol. 60, No. 5, Oct. 1, 2013, pp. 3955-3968.

Bendahan, J. et al. "Megavolt Computed Tomography for Air Cargo Container Inspection". Technologies for Homeland Security, 2008 IEEE Conference on IEEE, Piscataway, NJ, USA, May 12, 2008, pp. 7-11.

Chinese Office action for Application No. 201510227486.7; dated Apr. 27, 2017 18 pages (with English translation).

* cited by examiner

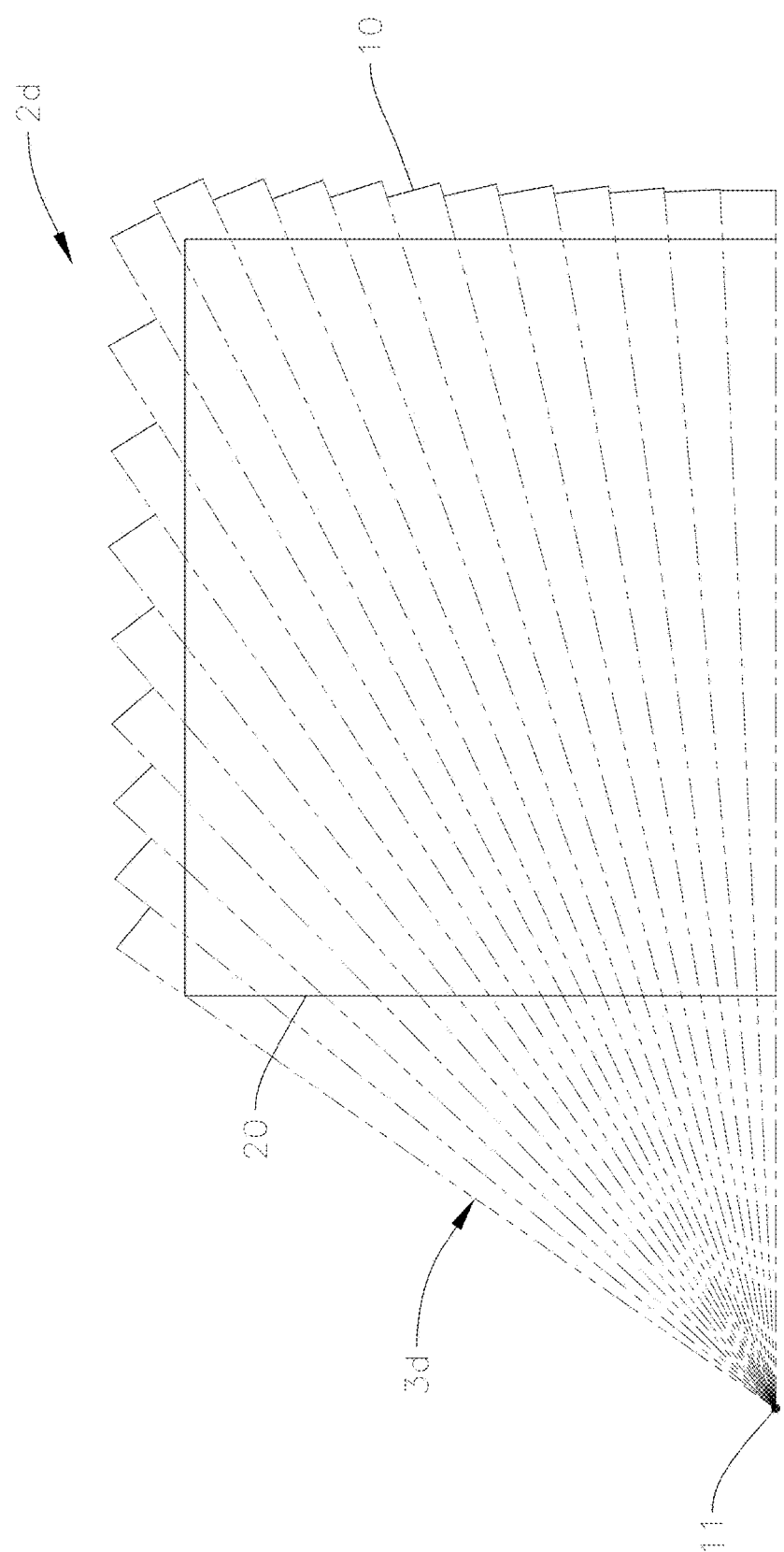

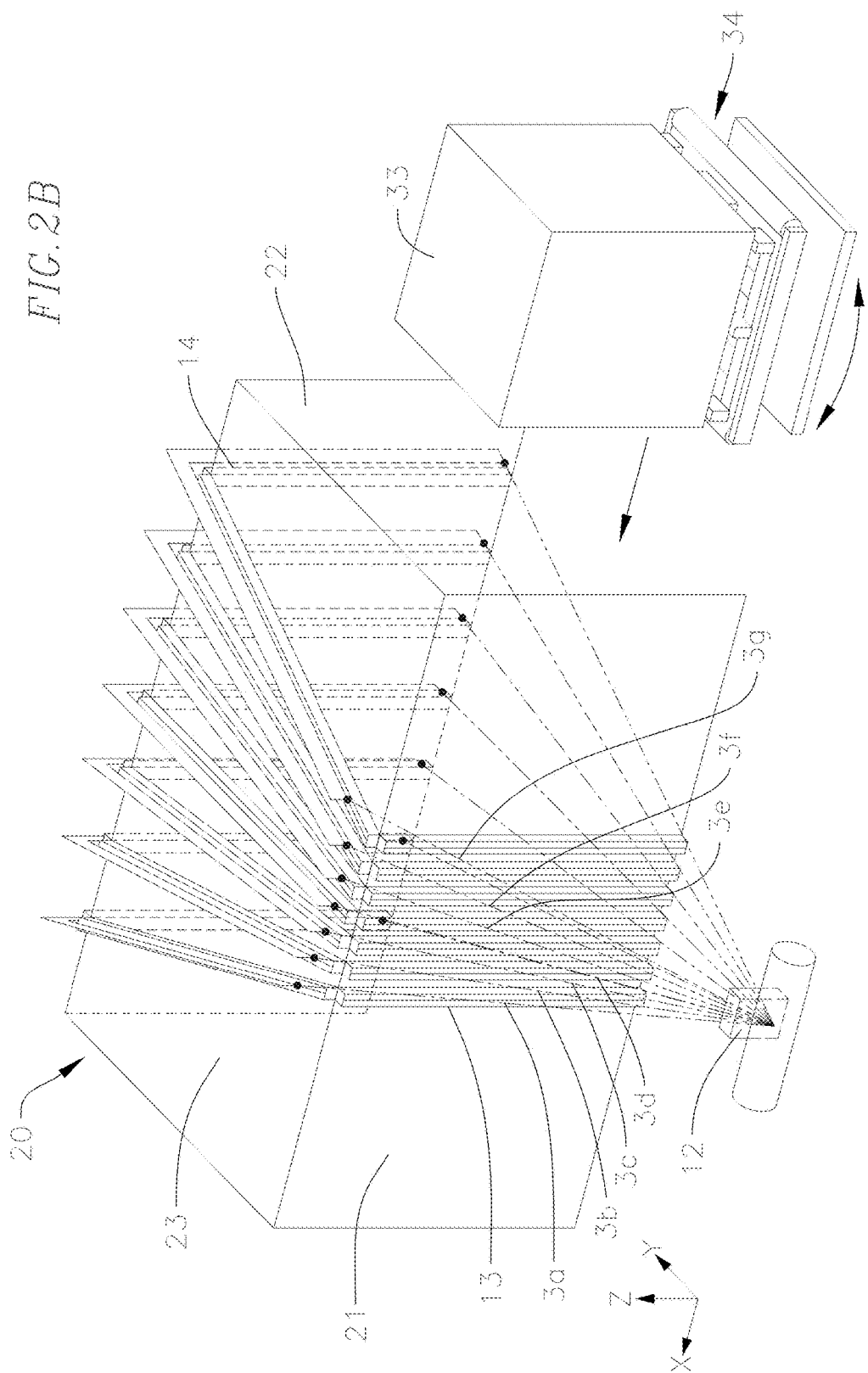

COMPUTED TOMOGRAPHY SYSTEM FOR CARGO AND TRANSPORTED CONTAINERS

CROSS-REFERENCE TO RELATED APPLICATION

The present disclosure claims the benefit of U.S. Provisional Patent Application Ser. No. 61/989,503, filed May 6, 2014, the contents of which are hereby incorporated by reference in their entirety.

GOVERNMENT LICENSE RIGHTS

This invention was made with government support under Contract No. HSHQDC-11-C-00011 awarded by the U.S. Department of Homeland Security, Office of Procurement Operations, S&T Acquisition Division. The government has certain rights in the invention.

BACKGROUND

The screening and inspection of cargo, including packages, baggage, mail, pallets, containers, materials and discrete objects such as machinery or vehicles, in customs and security applications is commonly conducted using X-ray imaging systems. Where palletized cargo is handled or materials are consolidated onto pallets or into large containers, it is often advantageous to inspect or screen the pallets and containers using X-ray imaging systems without the need to break-down these structures to constituent elements. Similarly it is often advantageous to screen large discrete objects, groups of objects or bulk materials without breakdown or disassembly in customs, security or non-destructive testing applications. Typically, for cargo or other items and materials of pallet or similar dimensions, X-ray imaging systems using X-ray generators in the range 180 kV to 450 kV are used to acquire projection linescan X-ray images in either single view or, increasingly, dual view forms. Such imaging systems may operate with dual energy imaging capability and provide certain limited information regarding the effective atomic number and density or thickness of the materials imaged. However, current commercial technology is inherently limited in the discrimination of objects and materials, as the projection image information provided is derived from the interaction of a polychromatic X-ray beam with all the materials along the line of sight path through the object between the X-ray source and each individual detector. The resulting X-ray projection image therefore has limited utility as multiple objects or features in a given region of the image are not individually resolved with respect to depth, but rather overlay one another and form image clutter. The recent trend of using dual view X-ray linescan systems, which provide an additional near orthogonal view, partially alleviates this clutter limitation. However, for many cargos, objects or materials, it remains unlikely that the contents, components or composition of interest will be sufficiently isolated in one of these two views for ready visual identification or to effectively support detection or analysis using automated systems designed to flag threat, weapon, contraband items or other characteristics. Similarly, both visually and using image analysis methods designed to synergistically exploit the independent information from dual views, it remains very difficult to adequately identify, detect and analyze target objects and characteristics. For both visually inspected and automated detection or analysis systems, a high probability of detection or discrimination and a low false alarm rate cannot typically be achieved using single or dual view X-ray linescan systems at an adequate level of performance for most applications.

For some screening and inspection applications, such as aviation hold baggage security, the state of the art for operational systems has advanced to the use of computed tomography systems to provide high resolution three-dimensional, volumetric information and has largely overcome the limitations mentioned above. Typically, helical scan CT systems using a rotating gantry mounting an X-ray source and one or more detector arrays are employed. Commonly multiple detector rows form partial rings over a detector arc of typically approximately 60 degrees. The bag or item to be inspected passes on a conveyor linearly through the aperture in the rotating gantry and screening can be conducted with high detection and low false alarm performance at many hundreds of bags per hour in the most advanced systems. However, this technology is not readily scalable to the dimensions of palletized or containerized cargo. The mechanical designs required to provide an adequate gantry aperture rotating at sufficient angular velocity and to mount high voltage and high power X-ray generator systems are cost prohibitive.

Similarly, significant advances have been made in the development of stationary CT systems for hold baggage inspection and security in various forms using arrays of switchable X-ray sources placed around the inspection tunnel in a plane essentially normal to the direction of conveyor travel. Detector arrays may be interspersed in the same image plane or just out of plane and acquisition of data suitable for CT reconstruction is accomplished by fast switching between X-ray sources and readout of pre-determined detector elements. However, these system configurations are also not readily scalable to the characteristics of palletized cargo as a primary cost driver for large scale screening systems is the X-ray generator subassembly. Arrays of high voltage, high power, and switchable X-ray sources are not commercially available and, if developed, would likely be prohibitively expensive for these applications.

In current security and customs X-ray screening, imaging, the information visualized, detection and analysis capability is tied to the system type used. For example, for palletized cargo, the current state of widely deployed technology allows the operator to view projected transmission images in typically one or two viewing perspectives at most, with the imaging and analysis limitations associated with X-ray transmission techniques discussed above. For hold and carry-on baggage, more sophisticated imaging techniques are available, as described above, providing 3D volumetric CT imaging where imaging information may be viewed by various means including in surface rendered form, slice form, readily manipulated by rotation about an arbitrary axis and displayed and visualized using many other tools. The volumetric 3D data provided by such systems also supports effective automated image analysis methods which can highlight threats, target objects and other characteristics. However, the CT techniques provided for hold and carry-on baggage have not been widely adopted for large and palletized cargo primarily because the physical sensor systems needed to provide such information have not been available in a sufficiently cost-effective form with suitable operational characteristics and performance.

Embodiments of the current invention circumvent the design limitations of current commercial CT screening and inspection technology and provide cost and operationally effective three-dimensional volumetric imaging information for pallet and larger objects beyond the dimensions of currently available technology. Other embodiments provide improved visualization of two and three-dimensional datasets from CT and transmission X-ray imaging to facilitate identification of objects, and analysis of contents, components or compositions of interest.

SUMMARY

One or more embodiments of the present invention include an imaging system for imaging the contents, components and/or composition of cargo or transported containers, and related methods. Additional embodiments include a system for creating a three-dimensional model based on image data from cargo or transported containers, and related methods.

An imaging system according to a present embodiment includes an x-ray or gamma ray source that emits an x-ray or gamma ray beam, a tunnel having a plurality of detectors, and a translatable platform. The detectors each receive a portion of the beam. The translatable platform supports cargo or a transported container and moves through the tunnel so that the cargo or transported container crosses the portions of the beam received by plurality of the detectors. The translatable platform may also rotate and move through the tunnel at multiple angles.

The imaging system may also include a computer and a graphical interface. The computer may receive information collected by the plurality of detectors from the portions of the beam when the cargo or the transported container crosses the portions of the beam. The computer may also reconstruct a three-dimensional image of the cargo or transported container based on the information. The graphical interface may display the three-dimensional image.

Additional embodiments include a system for creating a three-dimensional model based on image data from cargo or transported containers, such as the image data in the information collected by the plurality of detectors. The system includes a processor and a memory. The memory has stored instructions for receiving data representing information collected from a wide vertical beam angle, for processing the data to generate a three-dimensional volumetric model and for outputting the three-dimensional volumetric model.

These and other embodiments may include additional features, such as those described below.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other features and advantages of the present invention will be better understood by reference to the following detailed description when considered in conjunction with the following drawings. These drawings should not be construed as limiting the present invention, but are intended to be illustrative only.

FIG. 2A is a diagram showing an X-ray detector board layout of a center fan beam of FIG. 1 and FIG. 2B in vertical cross section.

FIG. 2B is a diagram showing collimation of the X-ray imaging system of FIG. 1.

DETAILED DESCRIPTION

Embodiments of this invention relate to X-ray transmission and computed tomography systems for imaging the contents, components and/or composition of transported objects, in addition to methods for analyzing and visualizing the resultant image information and related methods. More specifically, embodiments relate to X-ray and X-ray computed tomography inspection of transported containers and objects to determine the presence or absence of threat materials such as explosives, weapons and flammables, to identify the presence or absence of contraband such as illicit drugs and/or to inspect materials in non-destructive testing applications. Embodiments also illustrate systems and methods to create a spatially well-resolved three-dimensional image dataset from a plurality of images each derived from an X-ray source, X-ray fan beam and an X-ray detector array to aid in the identification of the above mentioned objects or materials of interest.

It is understood by those skilled in the art that spatially resolved three-dimensional X-ray image data sets support the effective implementation of automated object segmentation methods along with automated object threat/no-threat or alert/no-alert discrimination methods based on Hounsfield number, CT number or density characteristics of an object, region or volume. Such methods may be used in embodiments of the invention and may be extended to characterization of scenes, objects and materials using dual energy reconstruction of three-dimensional X-ray image data sets which may provide both volumetric atomic number and/or density information as is known in the art.

Figure 1:
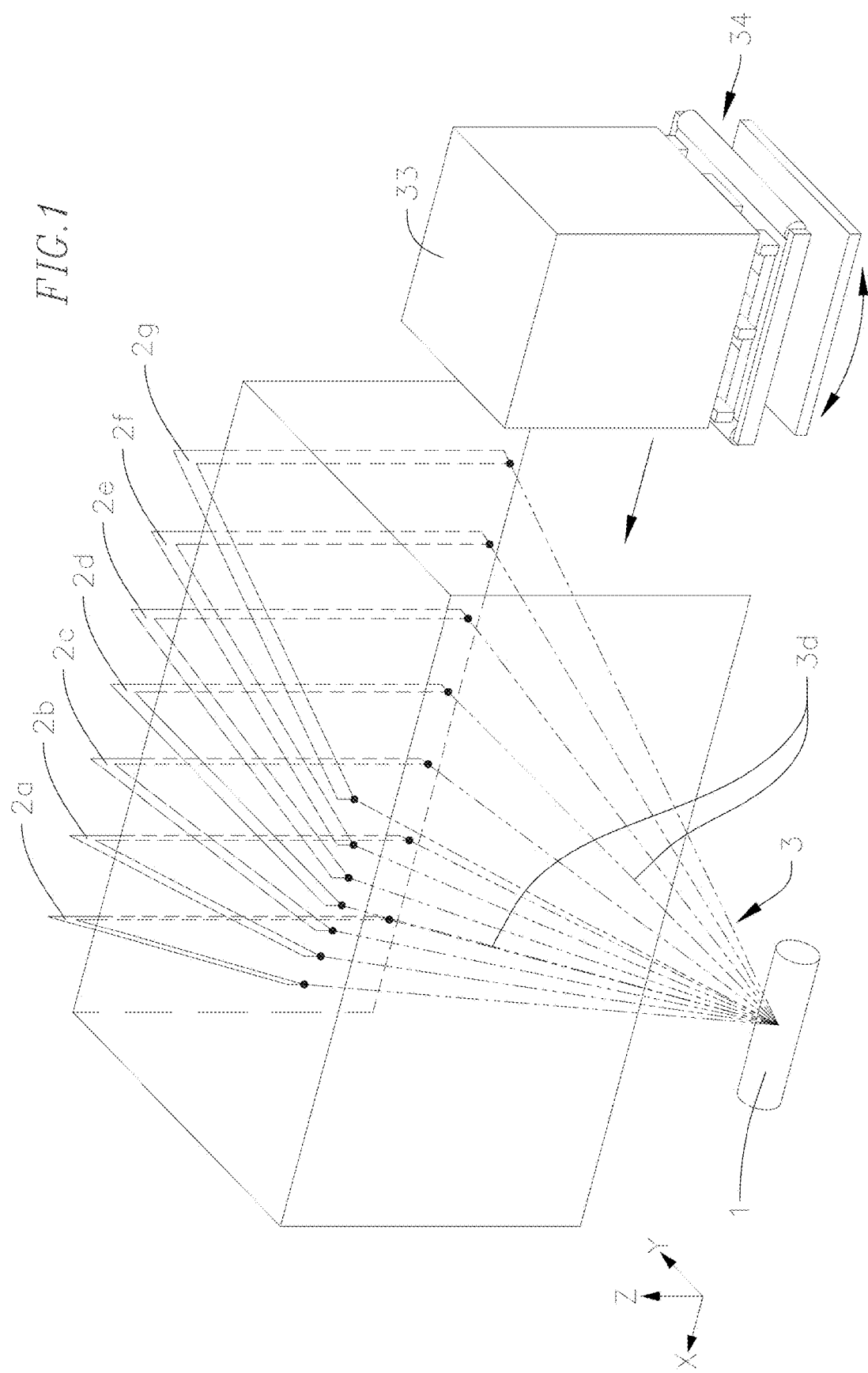
FIG. 1 is a diagram showing an overall X-ray imaging geometry and cargo motion functions of an embodiment of the invention.

The imaging geometry of one embodiment of a Computed Tomography System for palletized cargo screening is shown in FIG. 1. An X-ray source 1 provides an X-ray beam 3 (in this embodiment, the X-ray beam is a cone-shape or conebeam and covers a wide vertical angle) with an irradiation angle of approximately 60 degrees horizontally and 80 degrees vertically such that seven L-shaped detector arrays 2a-2g can be illuminated. The irradiation angles, shape and size of the X-ray beam and number of detector arrays can be modified so long as all the detector arrays are illuminated by the X-ray beam. The system may include between approximately 1 and 30 detector arrays. In embodiments similar to that shown in FIG. 1, the detector array and associated data acquisition system cost is a significant consideration and it is most cost-effective to operate with between three and nine detector arrays. However, the desired number of detector arrays can vary based on hardware procurement costs, application cost concerns and system performance requirements. The X-ray source may preferably be a high voltage, high power bipolar X-ray generator system with voltage between 320 kV and 600 kV. The X-ray source may also be a lower voltage, lower power monobloc design operating typically at 180 kV to 300 kV. Modified or custom X-ray generators incorporating a wide X-ray window suitable for irradiating the detector arrays as outlined above are available from commercial suppliers and their operating characteristics and configuration may be varied as required. In addition, alternate X-ray or gamma ray sources may be used such as Betatrons, Linear Accelerators and Radioisotope Sources to meet operational requirements such as object penetration.

In the embodiment shown in FIG. 1, each detector array 2a-2g is composed of 1280 detector elements each providing high and low energy X-ray signals using a sandwich detector configuration as is known to persons of ordinary skill in the art. Typically, such sandwich detectors would be optimized for high quantum efficiency for collecting high energy photons in the high energy channel and for adequate energy separation between high and low energy channels while retaining adequate low energy quantum efficiency. Energy separation is generally achieved by varying X-ray detector scintillator material and/or thickness and/or incorporating a thin filter material, such as a filter made from copper or steel, between the high and low energy detectors. As an example, the detector array 2d is shown in FIG. 2A as a vertical cross section through a center fan beam 3d (the center fan beam 3d shown in FIG. 1 is a center beam of the X-ray beam 3, which has been divided into separate fan beams 3a-3g by pre-collimators 13, discussed with respect to FIG. 2B below). A detector array 2d includes 20 individual detector boards 10 aligned normal to the source focal spot 11 and arranged about a scanner tunnel 20. Walls of the tunnel 20 may be the walls of a building or may be walls of a separate structure within or outside of a building. The individual detector boards 10 are each composed of 64 detector elements, each including, for example, a scintillator crystal and a diode for each of the low and high energy channels plus a filter material separating the two channels, or like elements known in the field, culminating in the total of 1280 detector elements per detector array. Although 1280 detector elements are used in this embodiment, the number of detector elements in one linear detector array, as well as the number of detector elements per detector board, and the number of detector boards per linear detector array may be varied. For example, for systems capable of imaging palletized cargo, approximately 640 or 2560 detector elements may be used, or any number of detector elements between approximately 640 and 2560. More detectors provide better 2D and 3D spatial resolution, but increase the cost of the system. Thus, a person of ordinary skill in the art may vary the number of detector elements based on these and other considerations, including beyond a range of 640 to 2560.

In some embodiments, the detector modules may be mounted adjustably in the x, y, and z directions of FIG. 1 to facilitate the initial alignment of the detector elements with respect to the assumed source and detector geometry used during reconstruction. The alignment of the detector and source system in this case bears on the efficiency and fidelity of the volumetric reconstruction and imaging result. It is noted that, in some embodiments, the reconstructed volumetric information from a test object, fiduciary reference object built into the imaging system, reconstructed scene or scene element may also instruct the physical adjustment of the detector and source geometry. In some embodiments the reconstructed volumetric information from a test object, fiduciary reference object built into the imaging system, reconstructed scene or scene element may also instruct the assumed source and detector geometry used for reconstruction of subsequent image scenes, mitigating or avoiding the need for physical adjustment of detector and source geometry.

In a further embodiment, FIG. 1 may be modified to consist of only the wall mounted section of each of the seven linear detector arrays 2a-2g, dispensing with all or any fraction of the roof mounted part of the detector arrays to reduce system cost. Such a configuration is particularly advantageous when combined with the horizontal slice, multiple source position and moving source CT embodiments (described below regarding FIG. 8) as in these configurations a sufficient projection data set for reconstruction can be acquired from all volumes within the pallet without the use of roof mounted detectors. These embodiments may have the disadvantage that multi-view transmission imaging information (which may provide superior image spatial resolution) may not be available to an operator for the whole pallet volume from a single image display perspective, as is achieved with the single X-ray source location and roof mounted detector configuration of FIG. 1. However, the horizontal slice and multiple source position embodiments do provide multi-view transmission imaging information from two or more static source positions and these image sets could be provided to the operator to view a restricted volume of the pallet from two or more perspectives.

FIG. 2B shows a collimation system used to form the X-ray fan beams 3a-3g composed of three collimation elements. (As a note, the number of fan beams is dependent on the number of detector arrays used and thus can vary as discussed above.) First, a source collimator 12, typically composed of an assembly of lead strips mounted on and within a steel structure, may be fabricated as a unit and may be adjusted laterally, vertically and via rotation about a horizontal axis for beam alignment with the detector arrays. The source collimator 12 is typically a relatively wide collimation sufficient to form the fan beams 3a-3g and minimize the required width of a second collimator element, pre-collimators 13. The pre-collimators 13 may be mounted on an inspection tunnel wall 21 to form the primary beam defining collimation and serve to restrict the fan beam width to that slightly wider than the detectors and thus minimize X-ray dose to the pallet and minimize X-ray scatter which may otherwise degrade imaging performance. The pre-collimators 13 may be adjustable laterally, vertically and in rotation about a horizontal axis for alignment and may be fabricated from lead strips forming a slot spaced by low X-ray attenuation materials and mounted on steel supports. A third collimation element, post-collimators 14, may be mounted on the detector side tunnel wall 22 and tunnel roof 23 which can be fabricated similarly to the pre-collimators 13 and can also serve to restrict scatter from the primary beams 3a-3g from reaching the detectors 2a-2g. The post-collimators 14 may also be adjustable for alignment with the X-ray fan beams 3a-3g.

Figure 3:
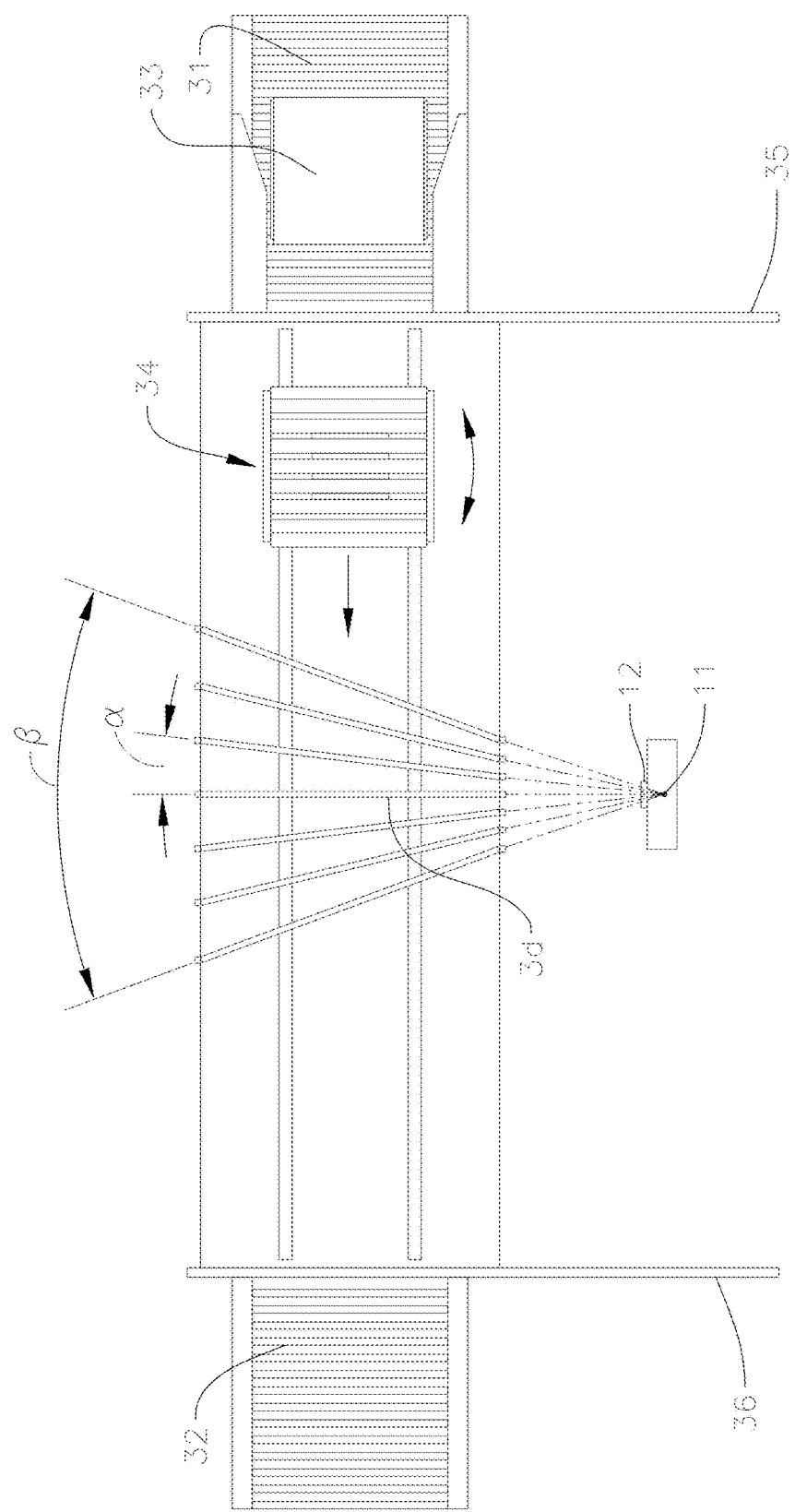
FIG. 3 is a diagram showing a top-down layout of the embodiment of FIG. 1, including a cargo motion system.

As shown in FIG. 3, the center fan beam 3d can be orientated vertically with each additional fan beam angularly spaced by rotation of $\alpha$ degrees horizontally about an axis vertically through the source focal spot 11. The angle $\alpha$ may be between the range of approximately 3 and 15 degrees, more preferably between 5 and 10 degrees. The total angle over which the fan beams are distributed is $\beta$ (i.e., the total angular range), which equals the number of spaces between the fan beams multiplied by $\alpha$. The angle $\beta$ may be below 180 degrees or below 120 degrees, or it may be preferably between the range of approximately 10 and 60 degrees, more preferably between 30 and 50 degrees. As $\beta$ increases, the tunnel length also increases. Thus, $\beta$ may be limited by the desired footprint for the system, but otherwise, a larger $\beta$ allows more detector arrays to be accommodated, which speeds data acquisition and allows for fewer passes while meeting image performance requirements. In the embodiment of FIG. 3, seven fan beams are equally spaced with an angle $\alpha$ of 6.55 degrees, culminating in the total angle across all fan beams of 39.3 degrees. It will be understood that, dependent on the spatial resolution, contrast sensitivity, scan time and cost requirements of the application, for example, more or less fan beams may be constructed with the knowledge that a greater number of fan beams can acquire a given projection data set with less passes and therefore more rapidly while the three-dimensional image quality obtained after reconstruction will be strongly dependent on the total number of projection data sets acquired. It is also noted that the fan beams need not be equally spaced and that in some embodiments where, for example, detector mounting space is limited, detector arrays may be progressively spaced to accommodate a higher number of arrays. Similarly it is noted that the fan beams need not be vertically aligned and could equally be orientated at any angle to the vertical or at various angles to the vertical.

Figure 4:
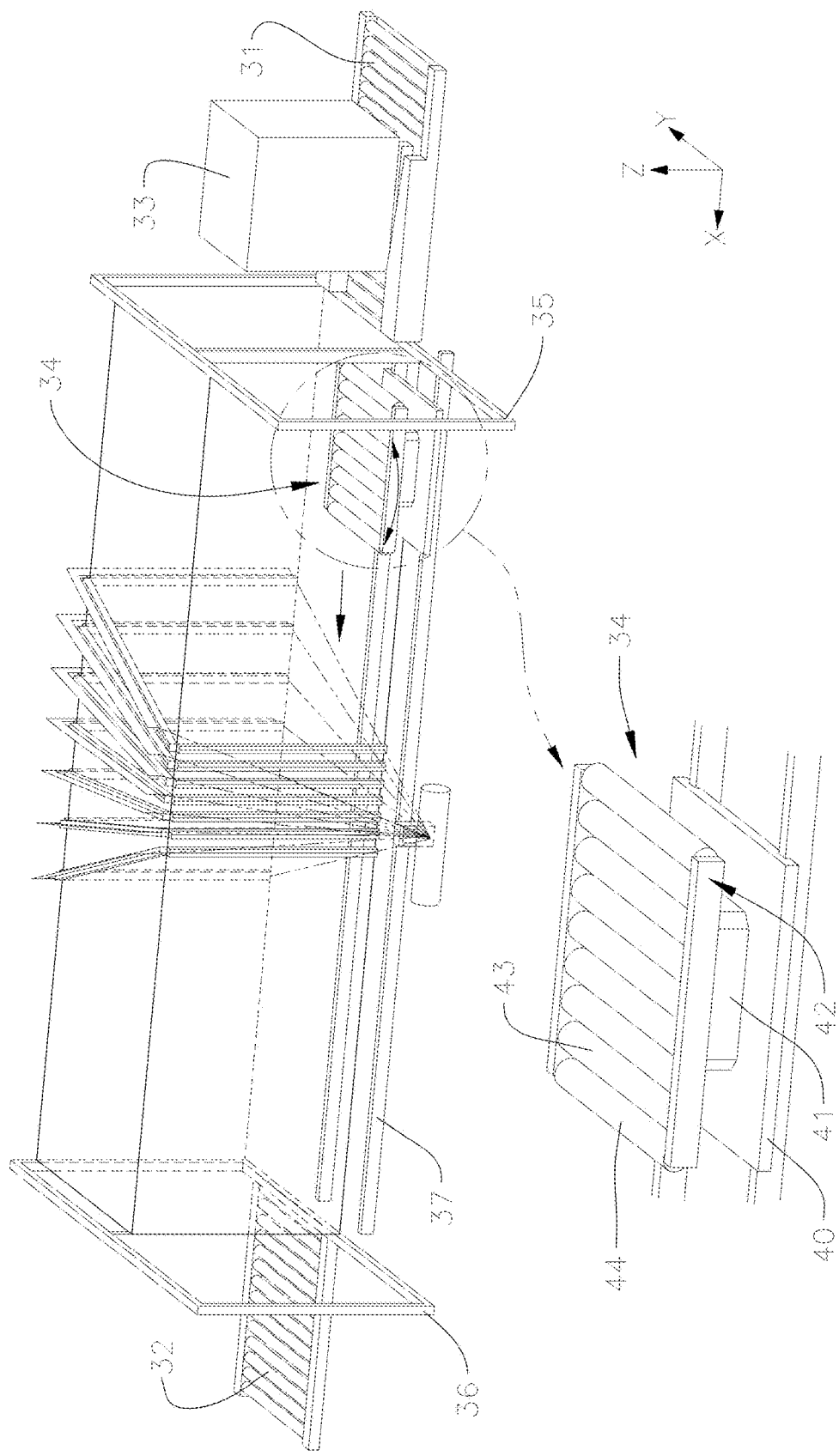
FIG. 4 is a perspective view of the embodiment of FIG. 3, including the cargo motion system.

As shown in FIG. 4 (and functionally represented in FIG. 5), a cargo pallet or container 33 may be both translated and rotated in a carefully controlled motion through the fan beams 3a-3g over multiple passes with the cargo 33 at various fixed angles to the fan beams 3a-3g. This may be accomplished by providing a two element, independently operable, translation and rotation stage 34. Translation can be accomplished by loading the pallet or container 33 from a conventional chain drive roller conveyor system 31, as is known by a person of ordinary skill in the art, onto the translation and rotation stage 34. The translation and rotation stage 34 includes a translation carriage 40 for providing translational motion of the translation and rotation stage 34 through the tunnel 20, a rotary stage 41 for controlling rotation of the translation and rotation stage 34, and a motor roller assembly 42 for transitioning the pallet 33 from the conventional chain drive conveyer 31 onto the translation and rotation stage 34.

Figure 5:
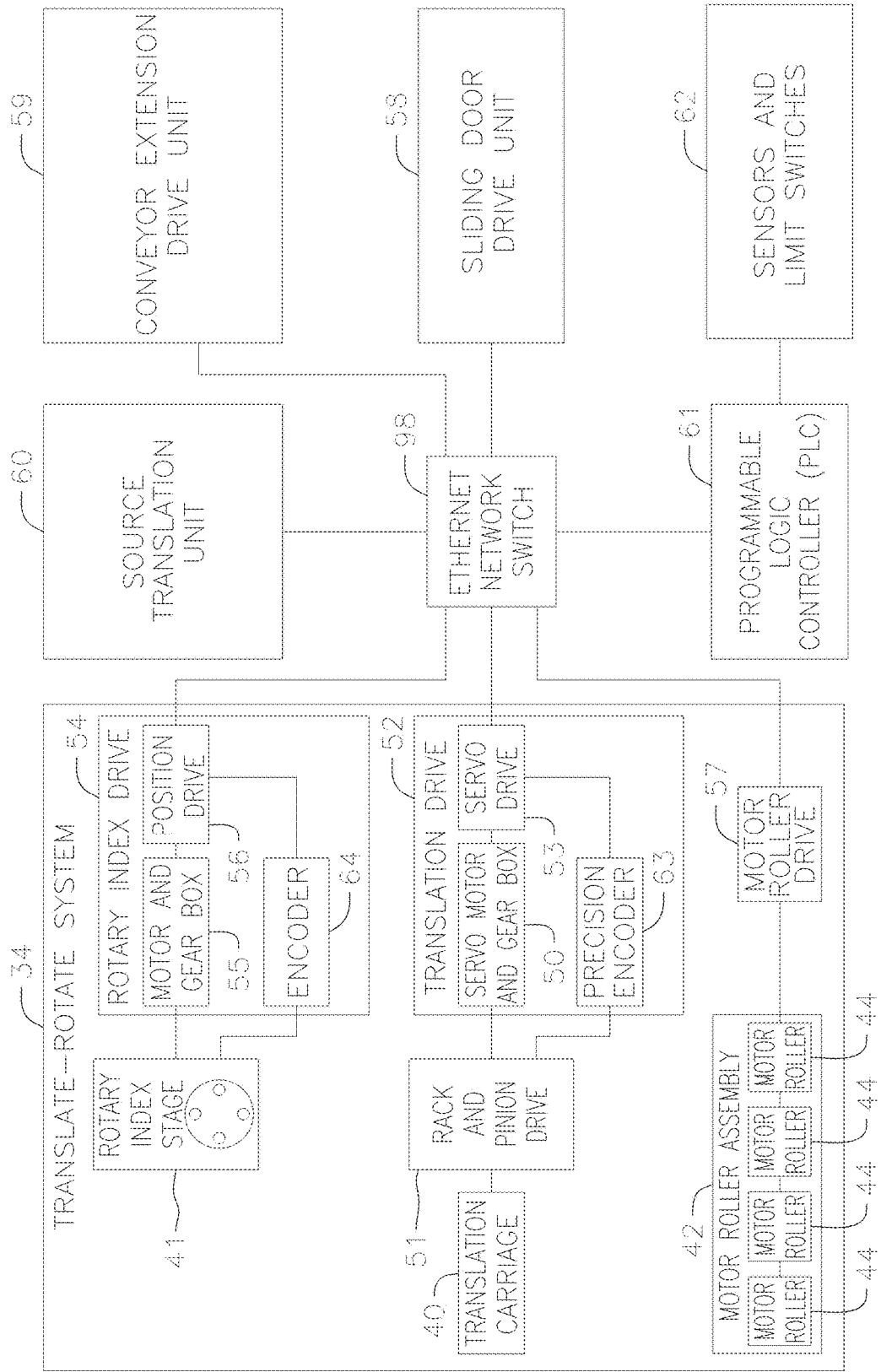
FIG. 5 is a block diagram illustrating elements of the cargo motion system of FIG. 4.

The translational carriage 40 provides the foundation onto which the rest of the translation and rotation stage 34 is mounted. The translation carriage 40 may be supported on precision V bearing rails 37 and driven linearly by a closed loop servo motor 50 using a precision rack and pinion drive system 51, as shown in FIG. 5. The servo motor 50 may have an associated gear box and be driven by a separate servo drive 53. The servo motor, gear box and servo drive collectively make up the translation drive 52.

The translation servo motor system 51, 52 may include a precision encoder 63, as is known to persons skilled in the art, such that the translation stage position and motion profile may be controlled to a precision and accuracy better than the required spatial resolution dimensions of the imaging system, approximately 1 mm in the current embodiment. Generally, the precision and accuracy to which the translation stage 34 is controlled is dependent on the spatial resolution required from the imaging system and it is preferable that the precision and accuracy of the translation stage motion not limit or degrade the overall resolution of the imaging system. When 3D CT information at a given spatial resolution is required, the precision and accuracy of the translation stage is preferably substantially less than the required CT spatial resolution, more preferably around 1 mm or less. The required precision and accuracy can be determined by simulation by ensuring the simulated positional and imaging reconstruction error of a theoretical test object is small when the theoretical test object position is perturbed from its nominal position in one or more projection datasets used in a simulated reconstruction applying the reconstruction method and system geometry model (source, detectors and motion system) of the embodiment concerned.

The translation servo motor system 51, 52 may be capable of translating the pallet 33 and the supporting assemblies at a speed in excess of 20 cm per second, which provides for a single translation pass and acquisition of seven projection images in approximately 30 seconds and four translation passes providing 28 view data for imaging reconstruction over 180 degrees of pallet rotation in approximately 150 seconds. These speeds allow for this embodiment to have an overall speed comparable to that currently obtained from single or dual view pallet imaging X-ray systems for a single pass, however, a particular speed is not essential to the system. Different speeds and different numbers of translation passes may be provided based on the CT imaging performance and operational and cost requirements. For example, a system using only 2 or 3 translation passes may be provided and operate with high translation speeds of 40 cm to 50 cm per second where a rapid, high throughput screening process is required. In these embodiments a higher linear detector array data acquisition rate may be required along with a higher X-ray source flux to retain imaging performance compared to an equivalent lower translation speed system.

The rotary stage 41 may be mounted on the translation carriage 40. The rotary stage 41 can be driven by a rotary index drive 54, comprising a servo motor and gear box 55, an encoder 64 and a position drive 56. The servo motor allows precision control of the rotary stage 41. The rotary stage 41 is capable of supporting the pallet 33 and assembly weight with sufficient overhanging load tolerance to set and control the angular position of the motor roller assembly 42 and pallet 33 to a specific predetermined tolerance. In the current embodiment, the angular position has precise and accurate control to better than 0.1 degrees. However, in other embodiments, the degree of angular control may vary based on the specifications of the system. For example, in a system using only 3 translation passes, the angular precision and accuracy may be lower because the resolution of the CT imaging is decreased. The rotary stage 41 can operate at full load including a 3500 pound pallet at approximately 10 degrees per second to minimize overall scan time during multi-pass imaging. Further, it is noted that although we describe the angular position as exact and accurately and precisely known it is not necessary or even necessarily optimal to implement and achieve any pre-determined and exact angular position. Depending on the reconstruction methods chosen, knowledge of the angular position used during each pass, such as from an encoder readout system, is sufficient for reconstruction.

The motor roller assembly 42 is mounted on the rotary stage 41 and consists of a combination of idler 43 and/or motor rollers 44, the latter incorporating an internal mechanical brake mechanism to ensure the pallet 33 loaded on to the assembly remains stationary on the assembly during translation of the carriage 40. The motor rollers 44 may be driven by a motor roller drive 57. Such motor rollers and control systems can be commercial off-the-shelf equipment and are known to persons of ordinary skill in the art.

Off-loading of the cargo pallet may be accomplished using a conventional chain drive roller exit conveyor system 32, as shown in FIG. 4. In a further embodiment, the chain drive roller conveyor loading and unloading systems 31 and 32 could be dispensed with and a pallet loaded directly by fork lift or other methods onto a simple rigid platform mounted on the rotary stage. For high voltage X-ray source systems, typically 450 kV or greater, entry motorized X-ray shielding doors 35, and exit motorized X-ray shielding doors 36 are typically required to attenuate scattered X-ray to low levels in accordance with accepted practice for ionizing radiation safety and radiation protection regulations. At lower X-ray source dose rates or when other means such as personnel exclusion zones are used, motorized X-ray shielding doors may be dispensed with in favor of shielding curtains, an open tunnel configuration or other methods of shielding and radiation protection including an entirely open or unshielded system.

Figure 9:
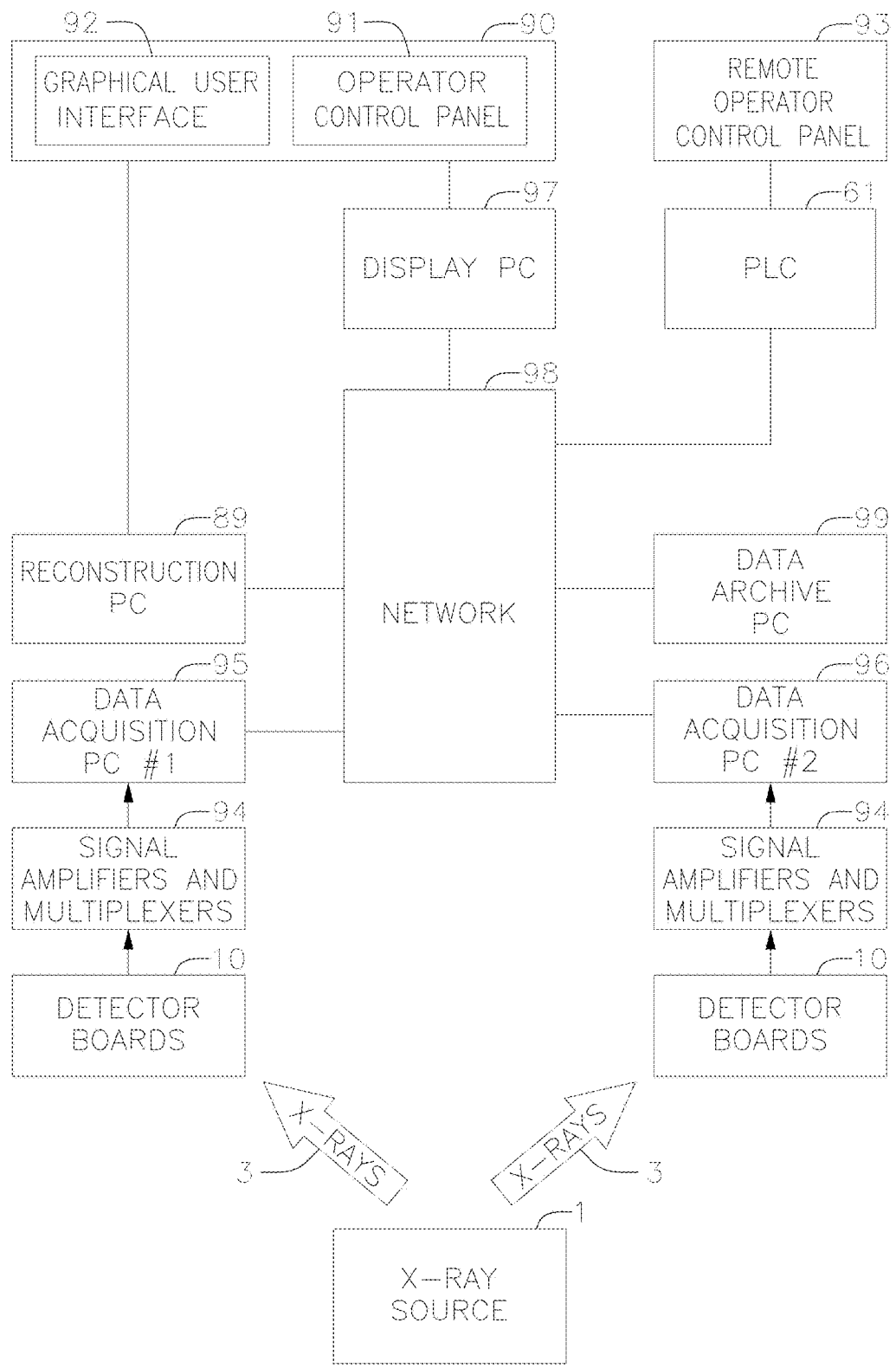
FIG. 9 is a block diagram depicting an operator control interface and a computer system for acquiring, processing, reconstructing, storing and displaying X-ray data according to an embodiment of the invention.

FIG. 5 further illustrates the function relationship between the translation and rotation stage 34 and other elements of the illustrated Computed Tomography System. The translation and rotation stage 34 is connected via a communications network, such as an Ethernet network 98, to various other systems of the Computed Tomography System. In addition to the systems in FIG. 5, the communications network 98 interconnects various computers for processing and imaging the information received from the X-ray beams 3, as shown in FIG. 9.

Figure 8:
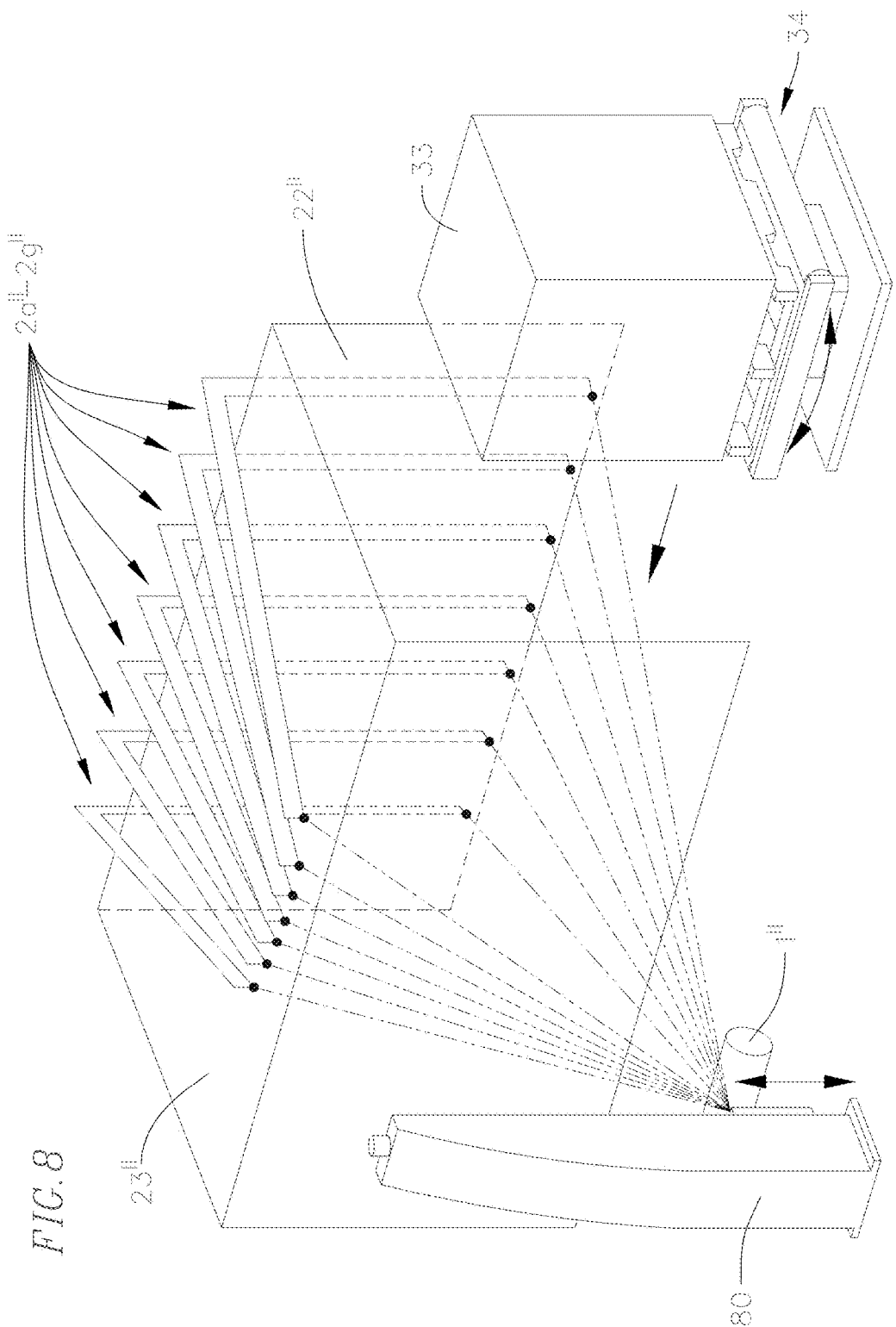
FIG. 8 is a diagram showing an overall X-ray imaging geometry and cargo motion functions of an alternative embodiment of the invention incorporating the facility to raise an X-ray source vertically in alignment with a pre-collimator and vertical sections of the detector arrays.

The network 98 connects the translation and rotation system 34 and several other drive units, sensors and limit switches to allow centralized control of the various systems. For example, the network 98 is connected to a sliding door drive unit 58, which includes individual motors and gears boxes for each of the entry and exit motorized X-ray shielding doors 35, 36. The network 98 is connected to a conveyor extension drive unit 59, which includes individual motors and gears boxes for each of the chain drive roller conveyor loading and unloading systems 31, 32. In some embodiments, the network 98 may be connected to a source translation unit 60, which includes a source translation drive, servo motor and gear box for raising and lowering the X-ray source as depicted in the embodiment of FIG. 8. The network 98 is also connected to a programmable logic controller (PLC) 61 and other control input/output modules which may be connected to various sensors and limit switches 62. The sensors may be photosensors that sense, for example, when the pallet 33 approaches the entry shielding door 35, when the pallet 33 is hanging over the sides, front or back of the translation and rotation stage 34, or when the pallet 33 exceeds the height limitations for entry into the system tunnel 20. Limit switches may be included that control the opening or closing of the entry or exit shielding doors 35, 36 and that control the proximity of the translation and rotation stage to its home position proximate to the entry shielding door 35 and the loading conveyor system 31. The PLC 61 may also be connected to a remote operator control panel 93, as shown in FIG. 9.

Figure 6:
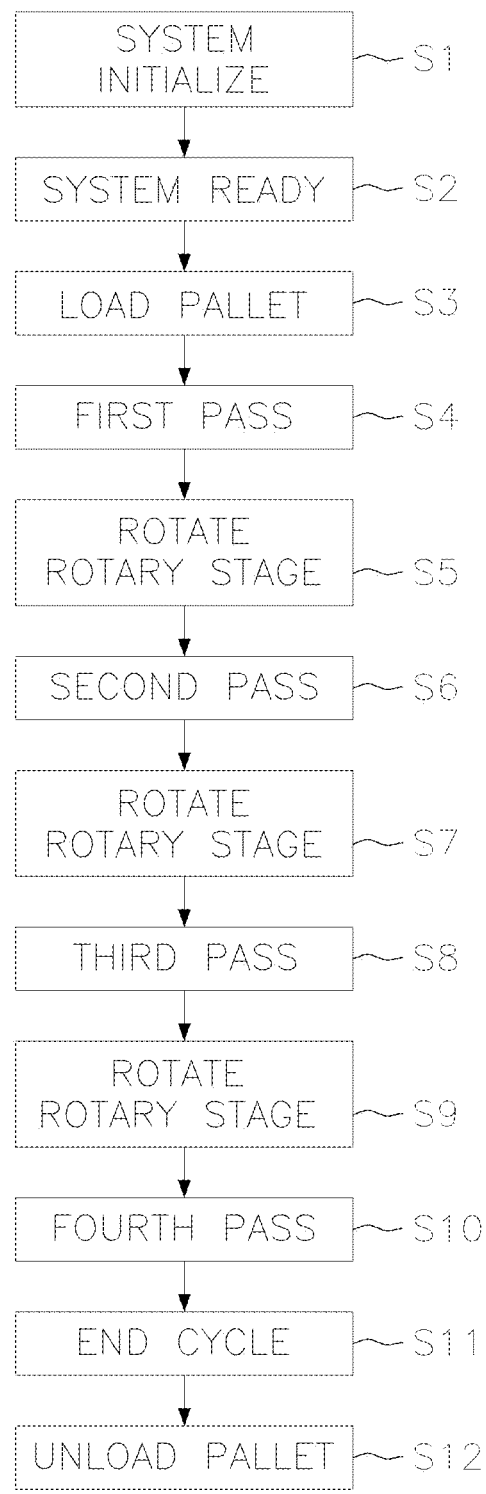
FIG. 6 is a scan process flow chart for an embodiment of the invention.

FIG. 6 shows a scan process flow chart of a method of using the embodiment of FIGS. 1-5. The system is initialized (S1) and various systems within the Computed Tomography System may be checked for faults. For example, during initialization, motion drives controlling the rotary stage 41 and the components involved in the X-ray imaging may be checked for faults, with any such faults being relayed to the operator via fault indicators. If no faults are detected, the system is ready (S2) for loading a pallet (S3). Any X-ray shielding doors may be opened at that point to receive the pallet into the tunnel for X-raying. The pallet loaded on the translation and rotation stage 34 then enters the tunnel, the X-ray shielding doors are closed and the X-ray source 1 is turned on. A first pass is completed (S4) in the forward direction with the pallet at a rotation stage position of zero degrees to initiate the scan cycle. In the embodiment of FIG. 1, seven projection images are acquired during the first pass, one by each detector array 2a-2g, and the rotary stage moves to a position of +45.85 degrees (S5) after reaching the exit end of the translation rails 37. A second translation pass is completed (S6) in the reverse direction at this rotational position and a further seven projection images acquired. Next, after reaching the entry end of the translation rails 37, the rotary stage moves to a position of +91.70 degrees (S7) and a third translation pass is completed (S8) in the forward direction. Finally, the rotary stage moves to a position of +137.55 degrees (S9) and a fourth translation pass is completed (S10) in the reverse direction to provide 28 projection images over 176.85 degrees. After the fourth pass, the cycle ends (S11) and the X-ray source 1 is turned off. The X-ray shielding doors may be opened to allow the pallet to exit the tunnel. The pallet may then be unloaded (S12) from the rotary stage. Prior to completion, if needed, the operator may stop the system during any of the above steps to address any issues that may arise, or if sufficient imaging information has been collected, to clear the pallet.

For example, the embodiment of FIG. 1 may be used with a scan cycle that can be dynamically extended or terminated by a screening operator to optimize system throughput in an operational environment. It will be understood that in some instances an initial translation pass may provide sufficient imaging information to clear a pallet or item of cargo and it may not be necessary to continue the scanning process. This embodiment therefore provides that, after one pass (S4), the screening operator can view the projection images acquired over a limited range of view angles and this may be sufficient to unambiguously clear the pallet based on transmission imaging alone if there is minimal image clutter. Similarly a three-dimensional reconstruction of the pallet may be provided to the screener based on the limited data available after only one pass. Necessarily, the spatial resolution in the y direction defined in FIG. 4 will be limited in this case. Should the operator decide that a second pass is required, this can be completed (S6) and a further set of seven projection views provided to the operator along with three-dimensional reconstruction of the pallet using data from 14 projection images. The operator may choose to clear the pallet at this point or proceed to a third pass (S8) when this process may again be repeated with an additional seven projection views available to the operator and improved three-dimensional reconstruction of the pallet using 21 projection images will now be available. Finally the operator may choose to complete four passes (S10) and acquire 28 projection views for inspection and for use in reconstruction.

It is also noted that other embodiments may extend the projection data acquired beyond 28 views, by extending the rotational angle of the pallet beyond 180 degrees, to 183.40, 229.25, 275.10 and 320.95 degrees for example, to improve reconstructed image quality. Alternatively further embodiments may provide a total of 56 views through acquiring intermediate view angles over approximately 180 degrees at 3.28, 49.13, 94.98 and 140.83 degrees of rotation for example. Further embodiments may provide a system that operates with less than four passes, depending on the desired spatial resolution, cost, etc. It is noted that the particular view angles indicated may be varied as determined by the number of detector arrays and their relative geometry incorporated in a system, the total number of views and translation passes required or the angular range, for example 90, 180 or 360 degrees, required for adequate reconstructed image quality. Similarly the view angles implemented in a scan process need not be uniformly spaced or extend contiguously across the full angular range of pallet rotation used, for example the view angles may cover zero to 45 degrees and 67.5 to 112.5 degrees but not the intermediate angle range. Further it may be desirable to extend the number of view angles beyond 56 views to 112, 224 or higher and to acquire these views through any angular rotation range of the pallet up to 360 degrees to increase reconstructed image quality.

Figure 7:
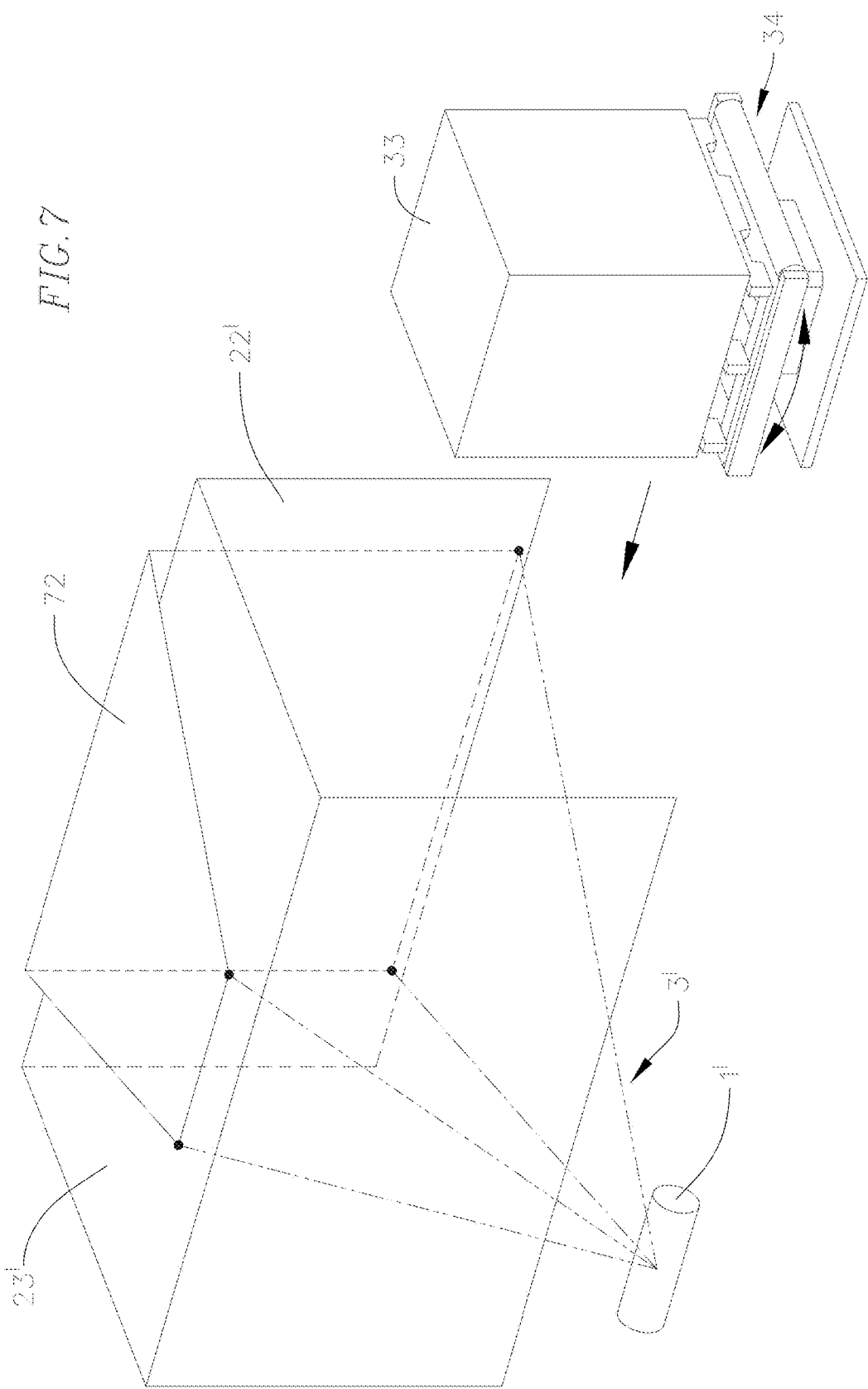
FIG. 7 is a diagram showing an overall X-ray imaging geometry and cargo motion functions of another embodiment of the invention incorporating area imaging detectors.

In FIG. 7, a further embodiment of the Computed Tomography System is shown where the collection of L-shaped linear detector arrays of FIG. 1 are replaced by one or more area imaging detectors 72 covering a desired solid angle and positioned on the tunnel roof 23' and/or back wall 22'. Such area imaging detectors may be, for example, fluoroscopic screens coupled with X-ray image intensifier systems or amorphous silica flat panel imaging detectors as is known in the art. Using X-ray beam 3', (the X-ray beam being cone-shaped in this embodiment, though other shapes are possible) irradiation of the area detector sensitive areas is achievable substantially without gaps in coverage. It will be understood that from a data acquisition and CT reconstruction perspective, the acquisition of 2D projection data sets from these area detectors is equivalent to the data acquired using the system illustrated in FIG. 1 where the number of linear detector arrays is maximized to populate approximately the entire solid angle between the first and last arrays but may be superior in aspects of contiguity, and equal in terms of scatter rejection with the appropriate collimation subsystems. Thereby, it may be a desirable configuration using the translate-rotate data acquisition method described above to acquire data from effectively many hundreds of views per pass using area detectors of this type.

As an alternative embodiment, it will also be understood that, with a pallet stationary between the source 1' and area imaging detectors 72 in FIG. 7, the image acquired from the divergent cone beam geometry is substantially equivalent, assuming the whole or a large proportion of the pallet is illuminated, in terms of the extent of information content to a 2D image acquired from a single L-shaped linear detector array during one translation pass. While the latter provides a parallel beam projection dataset it is understood that a plurality of 2D divergent cone beam images acquired over a sufficient range of discrete rotational angles of a stationary pallet using an area detector provides substantially equivalent information to the dataset acquired from a plurality of parallel beam projection images acquired using the multiple pass, multi-linear detector array, translate-rotate methodology described above. It is also noted that in this embodiment the projection data set acquired from various pallet rotation angles while at a fixed translation position may be inherently registered with respect to translation and may not require the registration step described below.

In a further embodiment, shown in FIG. 8, a powered lift 80 is provided to vertically raise and lower an X-ray source 1" and a source collimator assembly (not shown but attached to the source), while maintaining fan beam alignment with the pre-collimators and detector arrays 2a"-2g" mounted on the tunnel roof 23" and/or back wall 22". The powered lift 80 may provide vertical displacement, which may be read out via an encoder system, with the precision and accuracy of the displacement being sufficient not to degrade the spatial resolution of the reconstructed images. The precision and accuracy may be determined by simulation as described above. A vertical displacement accurate to within 1 to 2 mm may be used and the linearity of motion in the vertical direction also may be approximately 1 to 2 mm.

Vertical translation of the X-ray source 1" provides the facility to conduct volumetric reconstruction, including using iterative reconstruction methods, in a range of alternate or complimentary modes including horizontal slice, multiple source position and moving source scan modes.

In horizontal slice mode, data is acquired from X-rays emitted substantially horizontally from the X-ray source 1" and recorded by detector elements at the corresponding vertical position in each of the linear detector arrays 2a"-2g" of FIG. 8. This method takes advantage of higher speed, less computationally intensive reconstruction methods known in the art, including iterative methods, to produce a single, two dimensional, reconstructed image slice. Alternatively reconstruction may be conducted volumetrically over a limited (less than full pallet height) vertical cone beam range centered on the horizontal plane. The vertical cone beam angle can be in a range from approximately 20 to approximately 80 degrees, approximately 30 to approximately 80 degrees, approximately 40 to approximately 80 degrees, approximately 50 to approximately 80 degrees, approximately 60 to approximately 80 degrees from horizontal.

In practice the signal from detectors receiving illumination from rays out of the horizontal plane may also be reconstructed using 2D reconstruction methods by mapping individual rays into out-of-plane 2D horizontal datasets using closest fit or similar estimation methods. Such pseudo horizontal 2D data sets can then be reconstructed using 2D reconstruction methods known in the art, including iterative methods, to provide a plurality of stacked horizontal reconstructed slices over a significant vertical angular range from the X-ray source, typically 10 to 15 degrees. Such reduced datasets, in comparison to wide vertical angle reconstruction, may allow improved image quality from iterative reconstruction processing and be advantageous where computational requirements are high and reconstruction time is limiting. In the horizontal slice CT mode embodiments, 1, 2, 3, 4 or any number of translation passes may be completed at each source height position with varying pallet rotational angle for each pass in order to achieve the reconstruction image quality required.

Both the multiple source position and moving source CT scan modes of this invention provide methods to improve the sampling of reconstructed voxels (volume elements) throughout the pallet volume such that the subset of rays passing through a given voxel are more highly distributed through all directions and the sum of the ray path lengths through the pallet is minimized for a given voxel. It will be understood that rays through any voxel in the horizontal plane from the static X-ray source 1 located as shown in FIG. 1 are uniformly distributed through approximately 180 degrees after four passes with a minimal total ray path length through the pallet as all rays are incident normal to the vertical axis of the pallet volume. For voxels higher in the pallet the ray directions sampled become progressively more constrained and the path lengths correspondingly longer in summation. The multiple source position and moving source CT scan modes provided by FIG. 8 provide a means to reduce total ray path length through a given voxel and ensure each voxel is sampled over ray directions distributed as extensively as possible. These methods therefore provide improved 3D reconstruction image quality over the full pallet volume, and improved reconstruction over the most challenging pallet sub-volumes, at the expense of higher system complexity and cost.

The multiple source position embodiment of this invention locates the X-ray source at a fixed height for each translation pass, for example at zero, one third, two thirds and the full height of the linear detector arrays on the back wall of the scan tunnel during each of four translation passes. In further embodiments, any number of translation passes may be conducted at each source position as dictated by reconstructed image quality requirements and operational constraints. In the moving source CT scan embodiment of this invention, the X-ray source is translated vertically at a known speed or with a known motion profile during each pallet translation pass for example between zero and one quarter, one quarter and one half, one half and three quarters and three quarters and full height with respect to the linear detector arrays on the back wall of the scan tunnel during each of four translation passes. It will be understood that any combination of two or more static source positions or the translation of source position during pallet translation between any two or more source locations may be advantageous and are considered embodiments of this invention. It will also be understood that more than one fixed source may be used as an alternative embodiment to linearly raising a single source and acquiring datasets at more than one source location.

It is understood that the horizontal slice, multiple source position and moving source CT scan embodiments described above may be applied to all or part of the full volume of a pallet to acquire 3D volumetric imaging information as required.

FIG. 9 is a block diagram depicting an operator control interface, signal and data acquisition, data processing, reconstruction and data archiving subsystems of an embodiment of the invention. For example, the operator may initiate and control the scanning process shown in FIG. 5 from the operator workstation 90. The workstation 90 may consist of a dedicated control panel 91 including start and stop functions, image manipulation functions for 2D and 3D image data and status and warning lights such as system power, system ready and X-ray on indicators as is typically employed in the art and for compliance with safety and regulatory requirements. An exemplary operator control panel 91 is described in detail with respect to FIG. 10 below.

Figure 11:
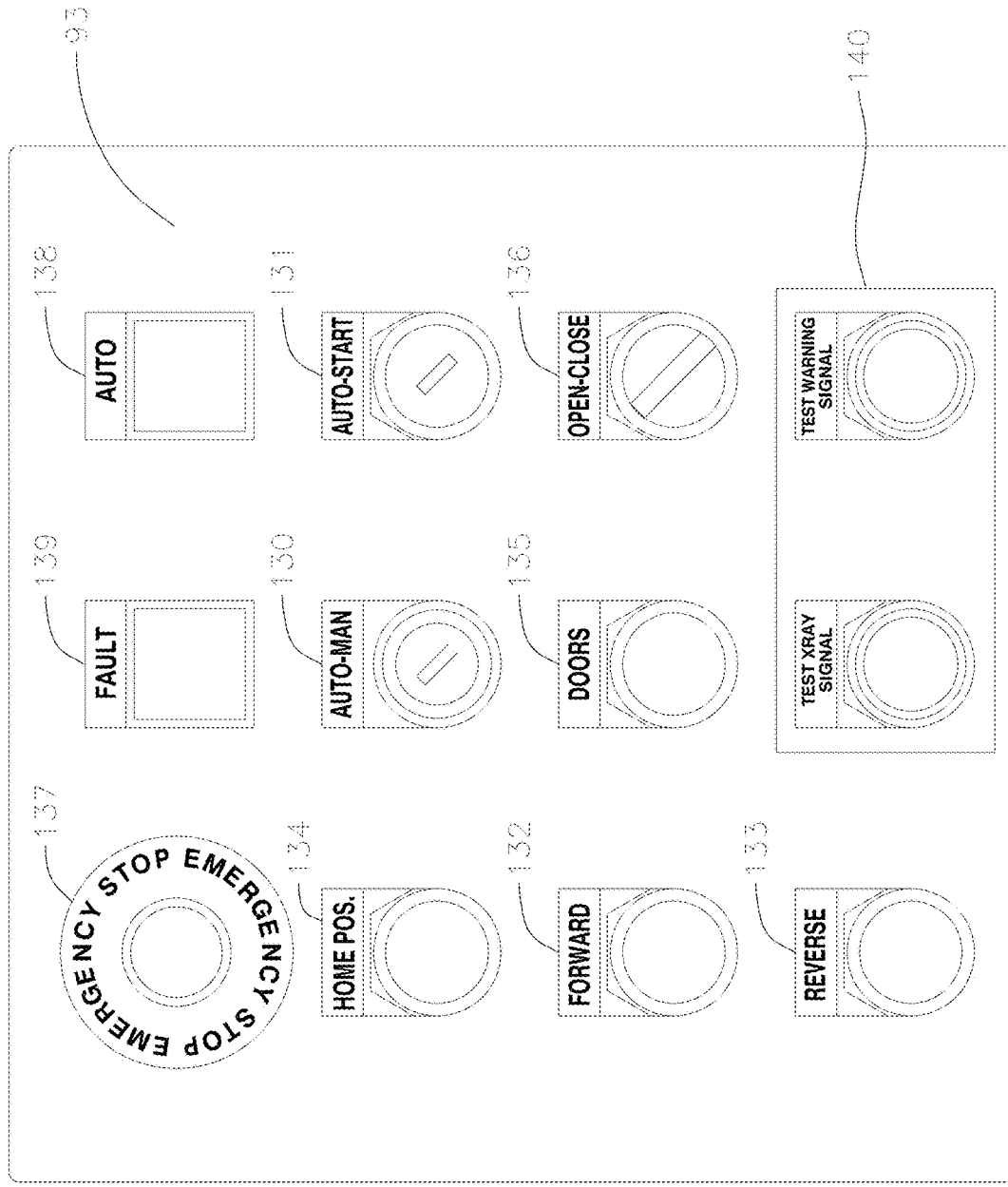
FIG. 11 is an illustration of a remote operator control panel according to an embodiment the invention.

The graphical interface 92 shown in FIG. 9 may consist of one or more display monitors depicting systems status and warnings and images manipulated in accordance with image display functions for 2D and 3D image data as is customary in the art. The additional remote control panel 93 may also be provided, as shown in FIGS. 9 and 11, giving local control of certain functions to an operator situated, for example, at the loading conveyor area. Such remote control panel 93 is discussed with regard to FIG. 11 below.

FIG. 9 additionally shows the signal detection, analog signal amplification, multiplexing and analog to digital (ADC) conversion architecture of FIG. 1. After the X-rays 3 are received as an analog signal at the detector boards 10, the signal may pass through signal amplifiers and multiplexers 94 for amplification and consolidation into a single data stream. The signal may then be digitized using PCI-Express interface analog to digital converter (ADC) boards mounted in two Data Acquisition PCs 95, 96 to support data acquisition across seven 1280 element detector arrays 2a-2g at approximately 166 Hz suitable for an imaging system translation speed of 20 cm/s. It is noted that substantially faster or slower data acquisition rates may be used dependent on the 2D transmission imaging and 3D reconstructed image spatial resolution and other imaging requirements. The signals received from the seven detector arrays 2a-2g may be divided between the two Data Acquisition PCs 95, 96 to aid in processing speeds, with signals from three detector arrays going to one PC and signals from the remaining four detector arrays going to the other. However, any configuration can be used to process the signals.

A further Display PC 97 may be used to provide video display of images and to interface to the image manipulation and control functions of the operator control panel 91. The Display PC 97 may be connected via a USB interface, Ethernet connection or other suitable means to the operator control panel 91 and via any standard video board and video signal output format to the display monitors composing the graphical interface 92. Data is transferred to the Display PC 97 over the Ethernet network 98 from each of the Data Acquisition PCs 95, 96 and is additionally transferred to a dedicated Data Archive PC 99 for long term storage.

Referring to FIG. 9, a Reconstruction PC 89 may also receive data from the Data Acquisition PCs 95, 96 over the Ethernet 98 and may reconstruct those data sets in approximately 1 to 60 seconds for four translation passes, 1280 detector elements per array at a line scan rate of 166 Hz. Slower reconstruction times of up to many minutes or tens of minutes may be acceptable in applications requiring a high volumetric image quality and therefore many translation passes or views. Volumetric reconstruction is preferably implemented in a parallelized architecture for speed using commercially available graphical processor board PC hardware with many hundreds of parallel processors. The Reconstruction PC 89 may display the reconstructed 3D dataset directly via video board output to a display monitor and the Reconstruction PC 89 may receive operator display and image manipulation commands from the operator control panel 91 via Ethernet communication from the Display PC 97. While an Ethernet network 98 is used to connect the various computers and components in this embodiment, other means suitable for transmitting data across these various components may also be used.

To reconstruct data sets received from the Data Acquisition PCs 95, 96, the Reconstruction PC 90 may include various software programs.

Figure 10:
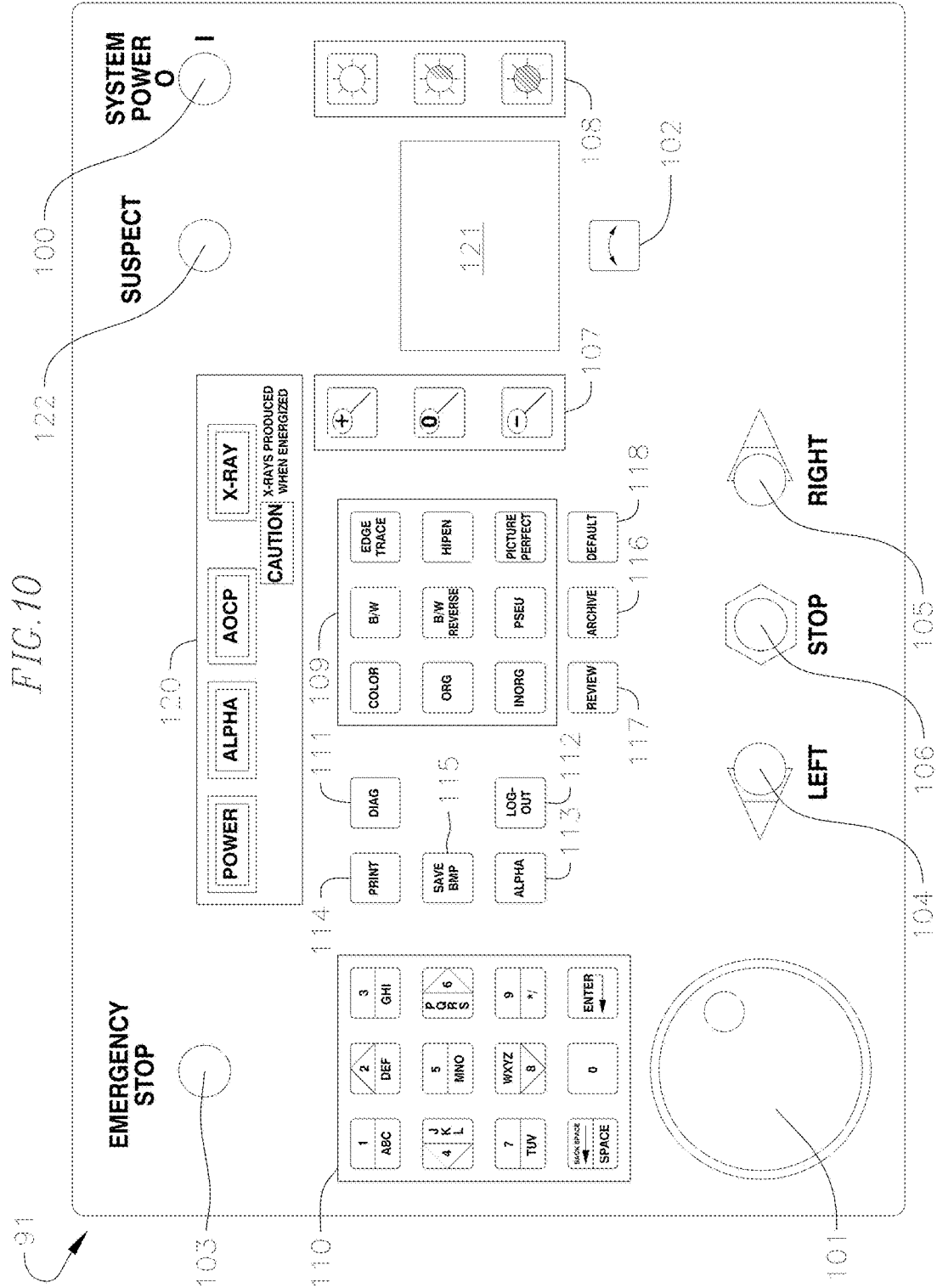
FIG. 10 is an illustration of an operator control panel according to an embodiment of the invention.

FIG. 10 is an illustration of the operator control panel 91 according to an embodiment of the invention. The operator control panel 91 provides various functions and features for the operation and visualization of results for the Computed Tomography System. For example, the operator control panel 91 controls system power 100 and provides a system emergency stop function 103 to discontinue operation of the system to address any issues that may arise. The operator control panel 91 can also control the movement of the translation and rotation stage 34. In one embodiment, as shown in FIG. 10, the operator control panel 91 includes a left button 104 that controls the leftward movement of the translation and rotation stage 34. Initial pressing of the left button 104 will run a first pass (S4) of the translation and rotation stage 34 through the X-ray beams 3 as described with respect to FIG. 6 above. If the operator determines that a second pass is needed, the operator can press the right button 105 to initiate rotation of the stage 34 and its rightward movement for completion of the second pass (S6). The operator can continue to use the left and right buttons 104, 105 as many times as needed to achieve the reconstruction image quality required for visualization. If sufficient imaging information has been collected, the operator may also stop the system at any of the above steps by using the stop button 106.

The operator control panel 91 also allows the operator to visualize the images reconstructed from the X-ray signals 3 so that the operator can locate potential threats, weapons, contraband items or other items of interest. Various buttons or other means to control zoom functions 107 and image brightness 108 may be included. Additional zoom features can be included to allow the operator to zoom in on a particular quadrant of the X-ray image. For example, in this embodiment, such zoom features are included as part of an alphanumeric keyboard 110, where numbers 1 through 9 represent different areas of the screen to which the operator can zoom using those buttons. The operator control panel 91 can further include various display modes 109 to enable the operator to better visualize the images. Display modes 109 can include color, organic, inorganic, black and white, reverse black and white, pseudo color and/or histogram equalization (picture perfect) modes. Edge trace and high penetration modes can also be included and can be used in conjunction with other display modes.

The operator control panel 91 may also provide diagnostic information and tracking information regarding threat identifications. A diagnostic button 111 can be included to allow the operator to view diagnostic information, including software and hardware status information, on the graphical user interface 92. Individual operators may have the ability to login/logout 112 of system screening operation such that statistics and operating information regarding individual operators can also be tracked. Individual operators can use the alphabetical setting 113 of the alphanumeric keyboard 110 to input login information.

The operator control panel 91 may also include a rotary, multi position or continuously rotatable, view selector 101 for use in moving between views displayed in 2D transmission imaging mode or rotating 3D image data about one or more axes. The control panel 100 may also include means such as a button 102 or the like to cause the display of views in 2D transmission imaging mode to "rock" or rotate view perspective by sequentially displaying views at differing view angles with a fixed or adjustable update frequency in order to provide the motion effect of image rocking or rotating on screen. Such display and viewing of 2D transmission images may include manually moving sequentially through views acquired from more than 1 pass or automatically "rocking" or rotating sequentially through views acquired from more than one pass using suitable geometric correction of each view, as is known in the art for individual views, to provide optimally smoothed visual transitions between views. In some embodiments, a separate interface or control panel may be provided to allow manipulation and rotation of 3D images.

Various additional functionalities may also be included in the operator control panel 91. The operator may have means to print 114 or save 115 screenshots of the currently displayed images. The operator may also be able to recall previously archived images 116 and to review recently viewed images 117. The operator may be able to reset all image display modes to their initial settings 118. The control panel 91 may include indicator lights 120 indicating various states of the system. For example, indicator lights 120 may provide information regarding whether the system is powered on, whether the alphabetical setting 113 is on, whether the control panel 91 is communicating to the Display PC 97 (see, e.g., the button labeled Advanced Operator Control Panel ("AOCP")), and whether X-rays are energized. The control panel 91 may also include a mouse trackpad 121. In some embodiments, the operator control panel 91 may include a suspect button functionality 122 that allows the operator to provide a response to a simulated threat incorporated into the acquired image (i.e., supporting industry standard threat image projection capability).

FIG. 11 is an illustration of the remote operator control panel 93 according to an embodiment of the invention. The remote control panel 93 may provide manual override control 130 of conveyor systems and doors and local initiation 131 of the scan process of FIG. 6. For example, the remote control panel 93 may allow control of the translation and rotation stage 34 and the input and output conveyors 31, 32 to move the stage 34 and the pallet 33 forward 132, backward 133, or to return the translation and rotation stage 34 to its initial position 134 at the X-ray shielding entry doors 35 and the pallet 33 to the input or output conveyors 31, 32, shown in FIG. 4. The remote control panel 93 may allow opening and closing control of the X-ray shielding doors 135, 136. System emergency stop 137 and reset functions may also be provided along with status indication, such as an indicator 138 indicating whether the system is in automatic or manual override modes, and warning lights 139, which may indicate whether a fault has occurred. In some embodiments, the remote control panel 93 may allow the operator to run tests 140 of various aspects of the system, including testing the X-ray on warning light function and testing the audible warning signal designated to signal when X-rays are on.

Figure 12:
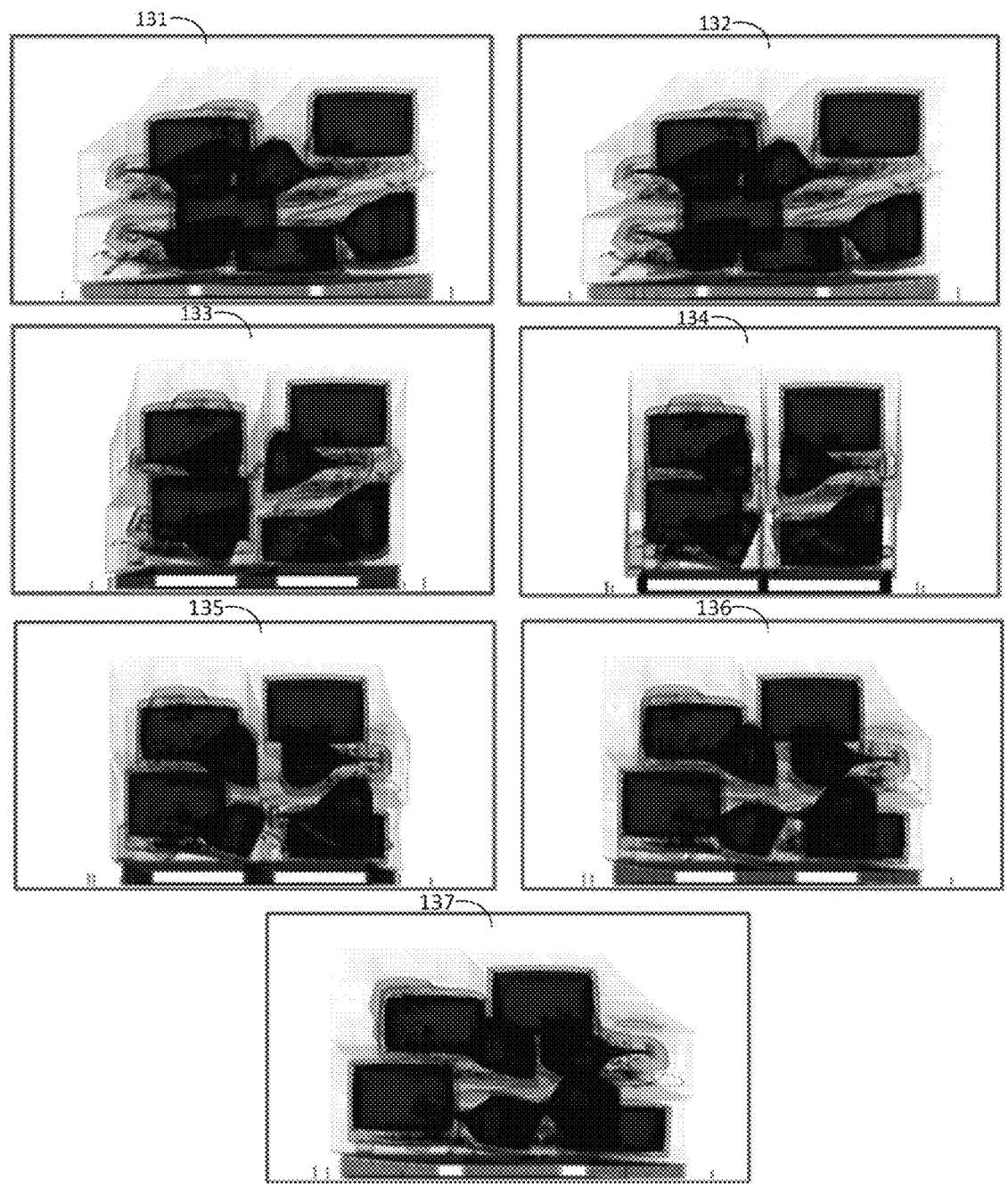
FIG. 12 shows X-ray transmission images acquired using the embodiment illustrated in FIGS. 1-4 after a single translation pass of a pallet from the entrance to the exit of the system at a fixed angle to the detector arrays.

FIG. 12 shows X-ray transmission images acquired using the embodiment illustrated in FIGS. 1-4 after a single translation pass (S4) of a pallet 33 from the entrance to the exit of the system at a fixed angle to the detector arrays 2a-2g. Each of the seven images 131-137 in FIG. 12 represents the data from a single detector array 2a-2g, where image 131 is acquired from the signal at detector array 2a, image 132 is acquired from the signal at detector array 2b, image 133 is acquired from the signal at detector array 2c, etc. Thus, each of the images is offset from each other by an angle. Image 134, acquired from the signal at detector array 2d, provides a vertical cross section of the pallet 33 in an angle perpendicular to the direction of translation of the pallet 33. Each of the images 131-137 may be in a color format as shown such that the color coding follows the industry standard conventions for X-ray transmission image display where the calculated effective atomic number of a given pixel is represented as a specific color with organic materials displayed in orange, inorganic materials displayed in green and metals displayed in blue.

Figure 13:
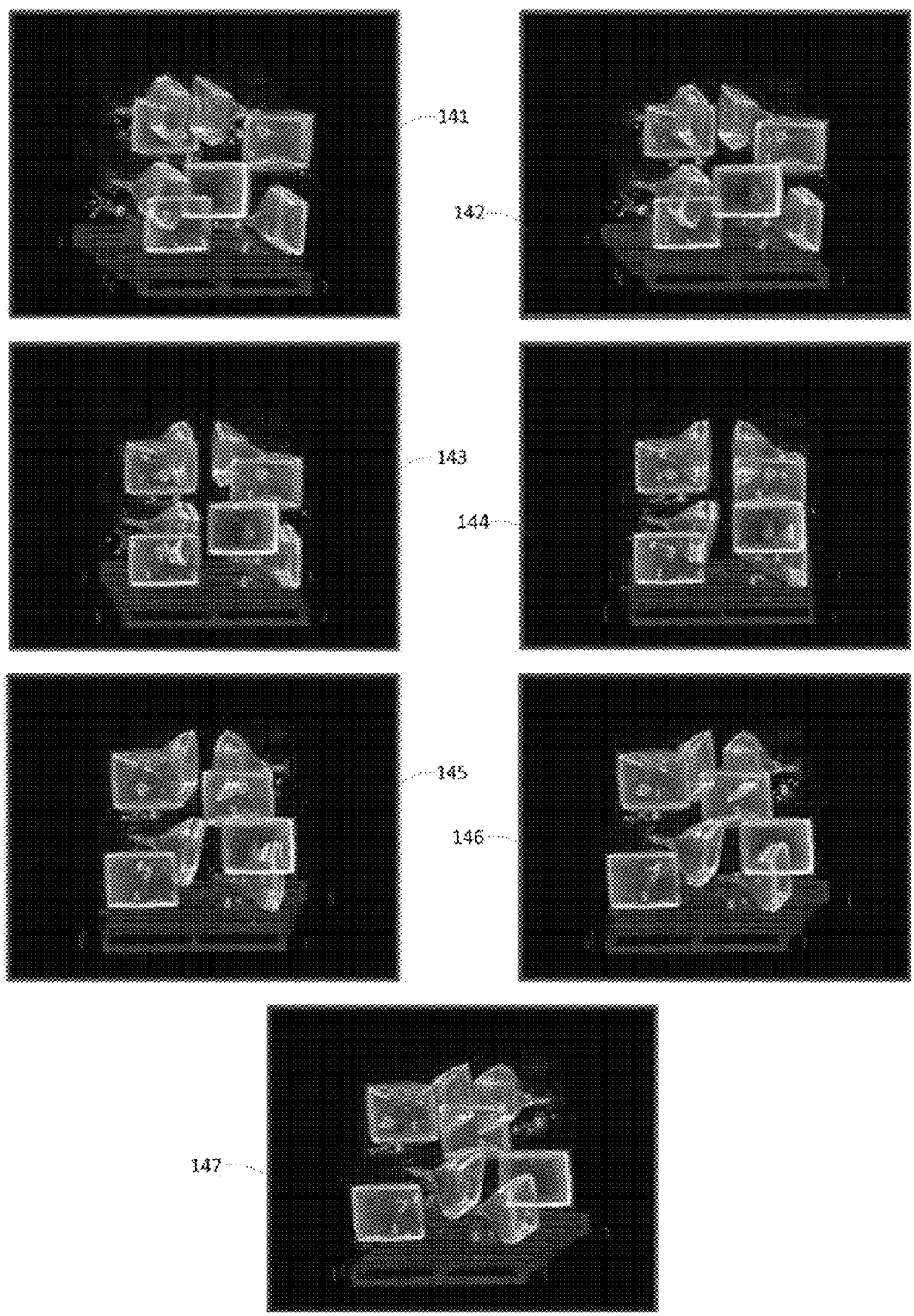
FIG. 13 shows image renderings of reconstructed volumetric X-ray data acquired using the embodiment illustrated in FIGS. 1-4. Viewing perspectives similar to FIG. 13 are provided and the reconstructed volumetric image is derived from four passes of the pallet at four discrete angles to the detector arrays.

FIG. 13 shows image renderings of reconstructed volumetric X-ray data acquired using the embodiment illustrated in FIGS. 1-4. Viewing perspectives 141-147 similar to FIG. 12 are provided for this 3D information and the reconstructed volumetric image is derived from four passes of the pallet 33 at four discrete angles to the detector arrays 2a-2g as discussed above.

To enable reconstruction of the three-dimensional, volumetric, image representing the pallet or container from linescan data, which is typically acquired with a constant data line acquisition period, each projection view may be registered by shifting left or right in time or position each projection view with respect to the relative timing of the translating and rotating stage 34 reaching a fixed reference position during translation. In the current embodiment, the fixed reference position is defined as the position of the center of rotation of the translating and rotating stage 34 when this is aligned with the center fan beam 3d. Other suitable reference positions may be used. Registration is accomplished by providing a timing or position signal accurate to better than the period or position displacement of one linescan data acquisition line from the Programmable Logic Controller (PLC) system 61 to the ADC board in the Data Acquisition PC, referring to FIGS. 9 and 12. The PLC timing signal is derived from a timing or position reference readout from the translation system servo drive 53, as is known in the art. Physical reference points readily visible in the projection images and attached to the translating and rotating stage 34, such as fiduciary positioning pins, may be used to visually calibrate and verify the registration. The timing or position signals may be provided at one translation stage time or position, such as when the center of rotation of the stage 34 reaches a given fan beam 3, or at a plurality of positions including one timing or position signal corresponding to each linescan period during the full range of motion of the translation stage 34. It is also noted that the projection data set need not be registered before reconstruction if equivalent timing or position information is provided to the reconstruction process and spatial registration is accomplished as part of the reconstruction process.

Figure 15:
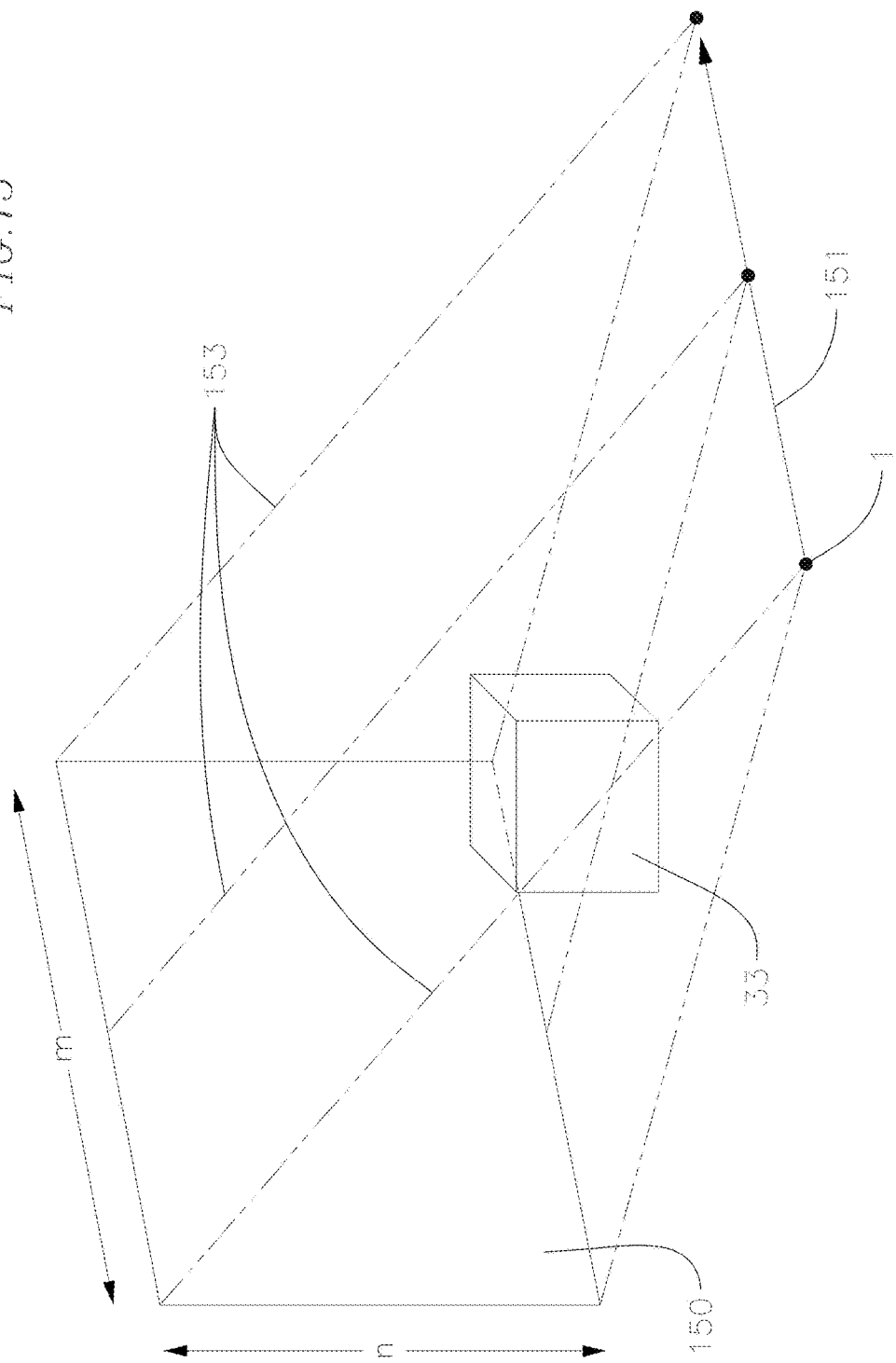
FIG. 15 is a diagram showing the parallel fan beam geometry of the embodiment of FIG. 1 after projecting data from a single fan beam onto a virtual detector space.

Efficient X-ray sampling of the pallet content is facilitated by the novel geometry of the embodiment of FIG. 1 and the other embodiments described above. The novel geometry of FIG. 1 can be termed a linescan sampled, cone beam projection geometry (LSCB) and the sampled X-ray line integrals through the pallet 33 are aggregated into p, n*m projection data sets acquired from a virtual area detector 150, as shown in FIG. 15, during the relative linear motion 151 of the source 1. Linescan data from a fan beam 3a (fan beam 3a is used as an example for this embodiment, but the fan beam can be any of the fan beams 3a-3g) is acquired at a given instant and relative linear displacement of the source provides for acquisition of the full 2D projection dataset p. The irradiated cone aperture of the virtual area detector 150 in this sampling geometry is approximately 40° by 65° aggregating all the views; however an economy of detector sensors (i.e., detector elements) is achieved through linescan fan beam collimation of the X-ray cone flux, combined with the specified relative motion of the pallet volume and/or source.

Unlike conventional CT methods, LSCB posits the incomplete radial sampling of the pallet volume, accepting the mathematically ill-posed reconstruction problem computed in these embodiments by Ordered Subsets-Separable Paraboloidal Surrogates (OSSPS). This method, at each iteration, finds a substitute objective function that, when maximized, guarantees the optimization of the original objective; this is done to alleviate the complexity of dealing with the original objective function. In the embodiment of FIGS. 1 and 15, the pallet volume, physically in motion, is sampled simultaneously as p planes, one plane for each linescan detector array (view). Each plane p or virtual area detector 150 is an m row parallel beam independent X-ray flux estimation system, sampling the non-uniform, but normalized emission from the X-ray focal spot 1 during relative motion. Similarly a plurality of n line-integral samples is acquired vertically across each detector array 2a-2g. A regular relative pallet volume motion of nominally 20 cm/s and a detector array linescan data rate of nominally 166 Hz places the p plane in position for the m+1th row sample and thus, in parallel, p n*m projection data sets are acquired sampling the pallet volume, where p is seven as provided in the embodiment of FIG. 1. The linescan data acquisition rate of 166 Hz may provide 2 to 3 times oversampling for each detector element of the linescan detector arrays 2a-2g.

Figure 14:
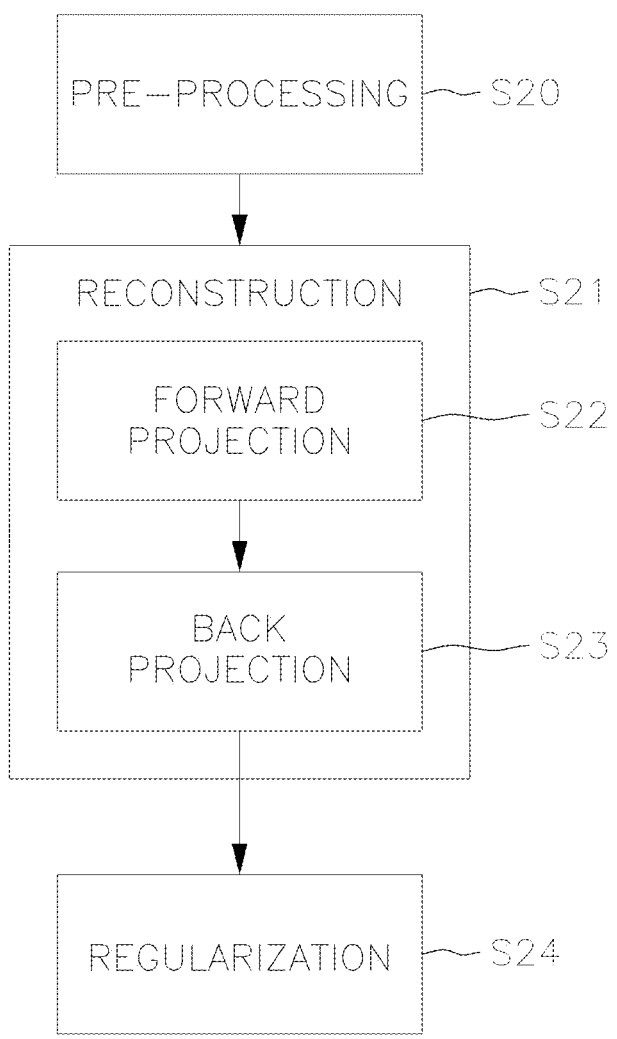
FIG. 14 is a flow chart showing a method of reconstruction and pre and post-processing according to embodiments of the invention.
Figure 16:
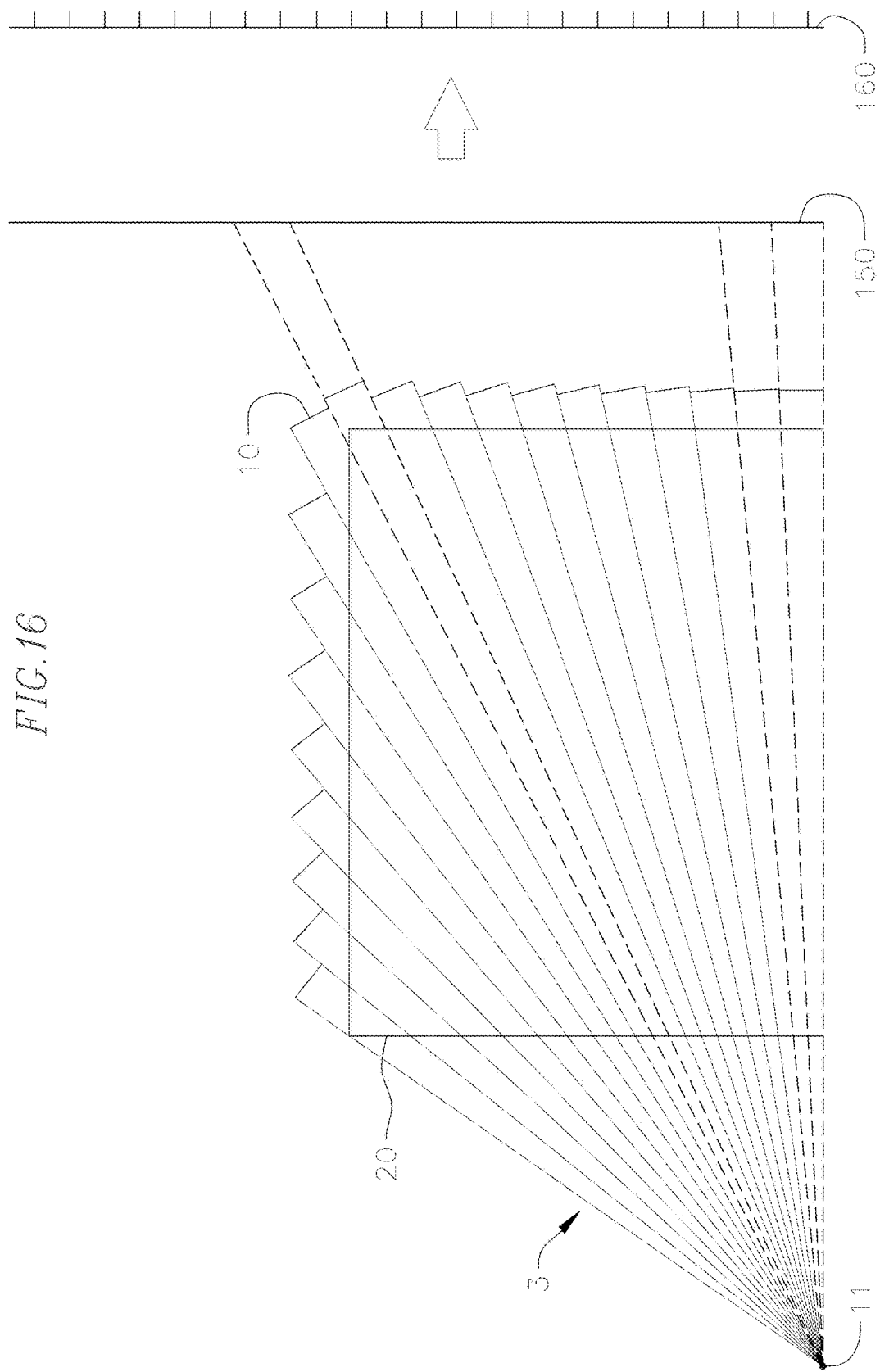
FIG. 16 is a diagram illustrating the projection of fan beam detectors on to the virtual detector space and uniform re-sampling, according to the embodiment of FIG. 15.

FIG. 14 shows a flowchart representing a method of reconstruction according to embodiments of the invention. In a pre-processing step (S20) prior to reconstruction (S21), the projection data from the native L-shaped detector geometry space described in FIG. 1 may be projected onto a planar virtual detector array 160 to simplify reconstruction method implementation and for speed and computational efficiency of reconstruction as shown in FIG. 16. The measured X-ray flux is geometrically mapped to discrete elements (m',n',p') on a computational plane 160 such that the non-uniform linear detector distribution 150 of the physical detector array is converted to a uniform linear detector distribution 160. This re-binning is accomplished to preserve adequate sampling and provide a computational structure. In a further embodiment, given the coordinates of the native detectors projected to the virtual space, an interpolant function can be built to represent the data as a combination of basis functions defined over a compact support mesh in two dimensions such as triangles or quadrilaterals. Once the data has been interpolated onto a uniform distribution of virtual detector elements 160, reconstruction may be conducted. Elements of line-integral magnification, line-integral incidence angle, line-line-integral dispersion, and other geometric factors are preferably assessed, tracked and incorporated into the reconstruction by mapping to the virtual detector plane 160 in this way.

For reconstruction (S21), embodiments may employ a statistical iterative reconstruction method that updates voxels simultaneously. Simultaneous update methods are preferred due to their scalability and ease of implementation in graphical processing unit (GPU) hardware; each voxel can be updated by a single GPU thread. Even if the number of iterations needed to converge may be higher than in a sequential update method, parallelized implementations can greatly reduce the execution time of each iteration. Due to the statistical nature of the reconstruction method, a model is assumed for the data and detector noise. The most general assumption that may be used is that of Poisson statistics for observed X-ray photons.

The statistical reconstruction methods may estimate the attenuation coefficients that maximize the conditional density given the observed dataset (a Maximum A-Posteriori or Penalized Likelihood estimation). Under a uniform prior assumption, this estimation problem can be reduced to Maximum Likelihood (ML) where the likelihood function, the probability of acquiring the measurements given the parameter estimates, is maximized. These type of optimization problems are not simple to solve, and in general do not have closed form solutions. Hence iterative methods are preferred, and the simplified Ordered Subsets Convex (OSC) or the more comprehensive Ordered Subsets-Separable Paraboloidal Surrogates (OSSPS) methods may be used. The reconstruction methods are described by Equation 1 (OSC) and Equation 2 (OSSPS) below and can be divided in two steps: the forward projection (S22) and the back projection (S23) (update step). During reconstruction (S21), OSSPS or OSC refines a candidate pallet-volume attenuation distribution by comparing by stages. Each volume is forward projected (S22) to estimate the projection subset that would generate it. This subset is compared to the actual measured data for each given projection position in the virtual detector dataset. The difference term is backprojected to the image space (S23) and scaled appropriately in order to update the current estimate. A stopping criterion may be used to terminate iteration when convergence is assured.

Figure 17:
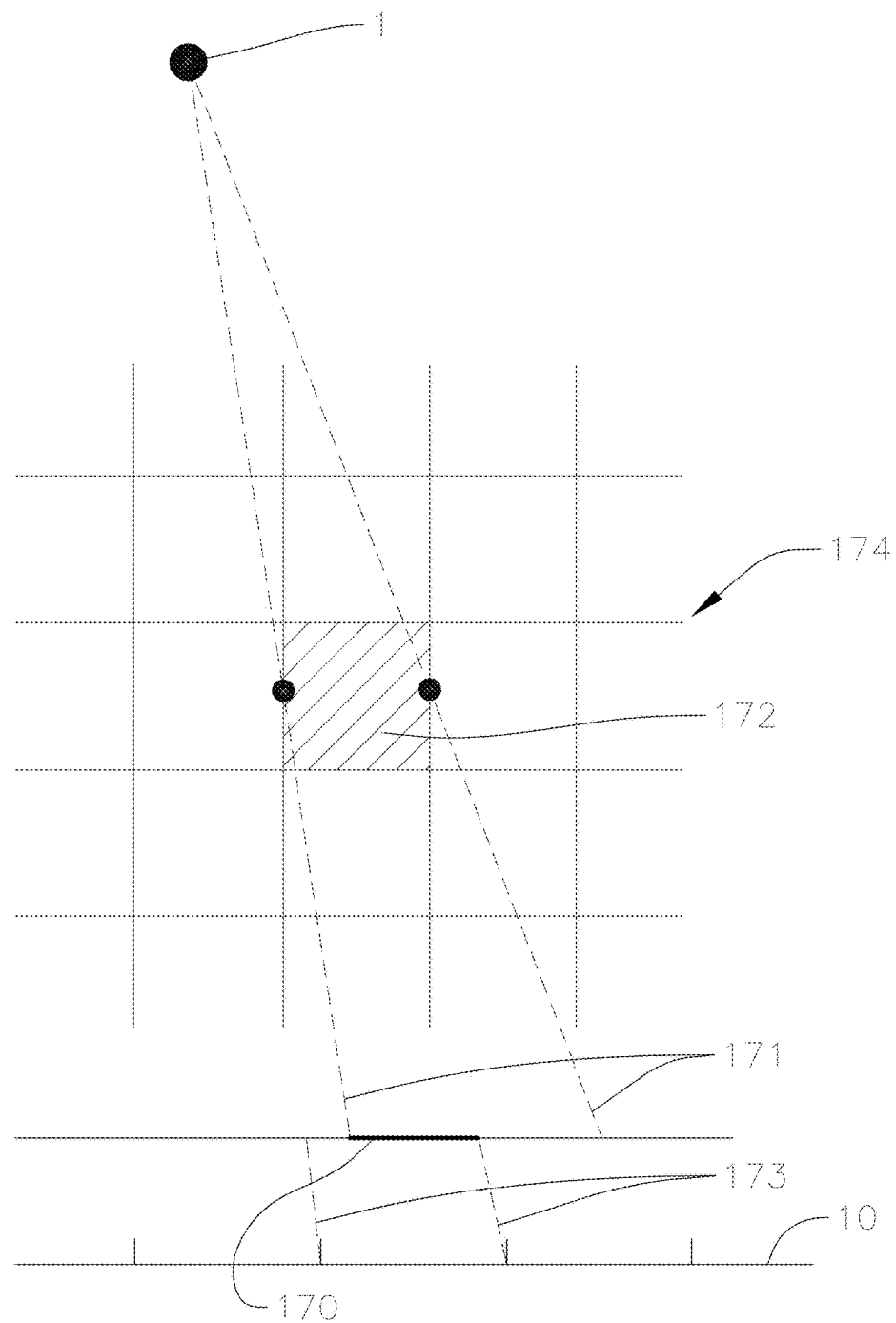
FIG. 17 is a 2D schematic of the projection of a voxel (volume element) shadow or footprint onto detector elements to compute the contribution during forward projection, according to the embodiment of FIG. 15.

The forward projection (S22) may be implemented on a ray by ray basis where the origin is the source 1 and the target is a particular detector element 173, as shown in FIG. 17. A given ray is attenuated as it travels through the object from source 1 to the given detector element 173 in the detector board 10. In some embodiments, such as the distance driven projector illustrated in FIG. 17, the footprint or shadow 171 that the voxel 172 projects onto the given detector element 173 determines the contribution weights in the discretized linear model. Such discretization is an approximation of the line integral of the attenuation coefficient distribution along a ray and the output of the integration represents the total absorption. This can be used to compute the expected number of photons detected by the particular detector element 173. In Equation 1 and 2, the forward projection values are used in both the difference term (numerator) and the scaling term (denominator).

The backprojection step (S23) consists of using the measured data and the computed data from the forward projection (S22) to update the image estimate. Rays that intersect the voxel 172 are found in order to look up the detector elements that contribute to the particular voxel 172. In the distance driven projector of the embodiment of FIG. 17, the footprint 170 of the detector 173 onto the image volume space 174 is used instead. The difference between measurements and computed projections is backprojected using the detector contribution to the voxel 172 as the backprojection weight. The same backprojection step (S23) occurs in the denominator. The difference image is then scaled by a normalization factor and added to the current estimate.

Besides parallelized implementation, the reconstruction process (S21) can be accelerated by using an ordered subsets approach in the embodiment of FIG. 1. With ordered subsets, the projections are partitioned in subsets; therefore, an update is computed using only the rays in the current subset instead of using the complete set of data. There are multiple criteria that may be used to assemble the partitions; for example, in these embodiments each subset is comprised of the data for a single pass, i.e., pallet rotation angle, with seven data planes p for the embodiment of FIG. 1. Other subset criteria may be used for image quality optimization. For a given iteration, the image updates may be implemented sequentially in a number of sub-iterations equal to the number of subsets. The current subset will be used to update the image estimate that is used as a starting estimate for the following subset. The next iteration will start after all subsets have been processed and included in an update. The updated image from the last subset will be used as an initial estimate for the next iteration. The method may continue its iterations until convergence is reached. One such convergence criteria may be to stop when the mean squared error between two consecutive image estimates falls below a threshold. Another suitable stopping criteria may be to stop when the largest voxel change across consecutive image estimates is small enough to be visually imperceptible (for example a few Hounsfield Units).

Imaging and the reconstruction process may also be improved by including a regularization step (S24). Regularization (S24) has been used in the art to enforce desired characteristics on the image estimate, including the reduction of noise and artifacts resulting from limited data. From a Bayesian perspective, the regularization can be considered prior knowledge over the image that can be incorporated through the Maximum a-Posteriori estimation. The OSSPS method has been derived from the penalized likelihood objective and allows the use of quadratic as well as non-quadratic penalties. Quadratic penalties function to smooth the image by trading less noise for loss of object contrast. However, edge-preserving non-quadratic penalties are preferred for their ability to reduce noise while retaining high contrast in the form of edges. In particular, the Huber prior may be applied as the penalty term, although other functions may be substituted.

$$\mu_{s+1}^n(k) = \mu_s^n(k) + \mu_s^n(k) \frac{\sum_{i \in S(s)} l_{ik}\left(b_i e^{-\langle l_i, \mu_s^n \rangle} - Y_i\right)}{\sum_{i \in S(s)} l_{ik}\langle l_i, \mu_s^n \rangle b_i e^{-\langle l_i, \mu_s^n \rangle}} \quad \text{Equation 1}$$

Update formula for OSC.

$\langle l_i, \mu_s^n \rangle$ Discretized acquisition model
$b_i e^{-\langle l_i, \mu_s^n \rangle}$ Expected number of photons
$Y_i$ Measured number of photons
$l_{ik}$ Contribution weights
$\mu_s^n(k)$ Attenuation Coefficient Distribution at iteration n, sub-iteration s, and voxel k $$\mu_{s+1}^n(k) = \mu_s^n(k) + \frac{|S|\sum_{i \in S(s)} l_{ik}\left(b_i e^{-\langle l_i, \mu_s^n \rangle} - Y_i\right) - \beta \sum_i w_{ki}\dot{\psi}(\mu_s^n(k) - \mu_s^n(j))}{|S|\sum_{i \in S(s)} l_{ik}\gamma_i c_i(\langle l_i, \mu_s^n \rangle) - 2\beta \sum_i w_{ki}w_\psi(\mu_s^n(k) - \mu_s^n(j))} \quad \text{Equation 2}$$

Update formula for OSSPS with regularization terms.

$\beta \Sigma_i w_{ki} \dot{\psi}(\mu_s^n(k) - \mu_s^n(j))$ Numerator Regularization term
$c_i(\langle l_i, \mu_s^n \rangle)$ Curvature function
$\gamma_i$ Projection of an image of ones
$\Sigma_i w_{ki}\omega_\psi(\mu_s^n(k) - \mu_s^n(j))$ Denominator Regularization term
$w_{ki}$ Neighborhood function:
$\omega_\psi(t) = \dot{\psi}(t)/t$ Function of derivative of the penalty In addition to the reconstruction method described in the embodiments above, volumetric reconstruction of the datasets acquired from the embodiments described herein may also be accomplished through the development of a range of other iterative or one-shot/analytical reconstruction methods known to practitioners skilled in the art. However, the prior art does not currently provide the benefit of large cone-beam angle reconstruction suitable for effectively and efficiently screening the full volume, or a substantial part of the full volume, of a pallet as described. However, many variants of both of these generic reconstruction methods are available and may be suitable for development and use with the embodiments described. These methods and variants are therefore incorporated by reference.

Iterative methods include general Iterative Back Projection (IBP), Algebraic Reconstruction Technique (ART), Simultaneous ART (SART), Simultaneous Iterative Reconstruction Technique (SIRT), Ordered Subset SIRT (OS-SIRT), Multiplicative Algebraic Reconstruction Technique (MART), Maximum Likelihood Expectation-Maximization (ML-EM), Ordered Subset Expectation-Maximization (OS-EM), Ordered Subset Convex Algorithm (OSC), Iterative Coordinate Descent (ICD), Ordered Subset ICD (OS-ICD), and Model-Based Iterative Reconstruction (MBIR).

As mentioned above, one-shot or analytical reconstruction methods may be suitable for and developed for the embodiments described herein. However, the method of Filtered Back Projection (FBP) is known to be limited in imaging performance when attempted with incomplete data-sets, i.e. a limited number of views and/or detectors as detailed by the Nyquist criteria applied to the Radon transform, resulting in unacceptable image artifacts and/or unacceptable image noise. This renders the FBP method, which is otherwise computationally efficient, sub-optimal for the embodiments of this invention in most instances. Similarly, when volumetric reconstruction is attempted with a moderate to large cone-beam angle, meaning angular divergence from a co-planar acquisition geometry where the source(s) and detector element(s) lie in a plane, Filtered Back Projection volumetric imaging performance breaks down out of plane. As a rule of thumb, out of plane data may only be adequately reconstructed through a low cone beam angle often characterized in the art as around eight to fifteen degrees or less from the horizontal plane. By contrast, the iterative reconstruction methods implemented in the above embodiments can provide adequate volumetric imaging performance for the embodiments described over cone-beam angles exceeding 20, 30, 40, 50, 60, 70 or 80 degrees from the horizontal plane thereby enabling the cost effective, efficient and accurate inspection and analysis of a pallet. Additionally, iterative reconstruction, which has become less costly to implement as a result of recent advances in low cost PC platforms and GPU's, operates more robustly with datasets consisting of low numbers of views and provides improved volumetric imaging results with reduced image artifacts.

While the above reconstruction methods are described with respect to the embodiment of FIGS. 1 to 4, it will be understood that the method may be applied by those skilled in the art to the alternate embodiments described above.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof. For example, although some of the above embodiments describe use of the computed tomography system with palletized cargo, other containers such as aircraft Unit Load Device (ULD) containers, hold baggage and carry-on baggage can also be used with embodiments of the current invention, such as by making modifications to the X-ray source, the size of the tunnel and/or detector arrays to accommodate the corresponding size of the ULD container, hold baggage or carry-on luggage. Similarly, the highly detector efficient target object sampling geometry described may also be used in applications beyond security and customs screening and inspection, for example in non-destructive testing and imaging of machinery or other products or materials where large scale objects, assemblies of objects or bulk materials are inspected.

The invention claimed is:

1. An imaging system for imaging contents, components and/or composition of cargo or transported containers, the imaging system comprising:
   an x-ray or gamma ray source configured to emit a beam, the beam being an x-ray or gamma ray beam, respectively, and covering a vertical angle;
   a tunnel having a plurality of detectors arranged in horizontally spaced apart linear arrays, wherein each linear array is configured to receive, respectively, a portion of the beam, each portion being fan-shaped and configured to cover the vertical angle of the beam;
   a translatable and rotatable platform configured to support cargo or a transported container and to move through the tunnel so that the cargo or the transported container crosses the portions of the beam received by the linear arrays when the source is emitting the beam;
   wherein the platform is configured to rotate so that the platform is horizontally translatable through the tunnel at multiple angles; and
   wherein, when the source is emitting the beam and the platform is supporting cargo or a transported container, the platform is configured to translate the cargo of the transported container completely through the portions of the beam received by the linear arrays at a first angle, and to translate the cargo or the transported container completely through the portions of the beam received by the linear arrays at a second angle.

2. The imaging system of claim 1, wherein the source is an x-ray source and the beam is an x-ray beam.

3. The imaging system of claim 1, wherein the plurality of detectors comprises 1 to about 30 linear arrays.

4. The imaging system of claim 1, wherein the plurality of detectors comprises 3 to 9 linear arrays.

5. The imaging system of claim 1, wherein the ray source is configured to emit the beam with a wide vertical cone beam angle.

6. The imaging system of claim 5, wherein the wide vertical cone beam angle is in a range from approximately 20 to approximately 80 degrees from horizontal.

7. The imaging system of claim 1, wherein the linear arrays are spaced apart by an angle between approximately 3 to approximately 15 degrees relative to the source.

8. The imaging system of claim 7, wherein a total angular range over which the linear arrays extends is between approximately 10 and approximately 180 degrees.

9. An imaging system for imaging contents, components or composition of cargo or transported containers, the system comprising:
   an x-ray or gamma ray source configured to emit a beam, the beam being an x-ray or gamma ray beam, respectively, and covering a vertical angle;
   a tunnel having a plurality of detectors arranged in horizontally spaced apart linear arrays, wherein each linear array is configured to receive, respectively, a portion of the beam, each portion being fan-shaped and configured to cover the vertical angle of the beam;
   a translatable and rotatable platform configured to support cargo or a transported container and to move through the tunnel so that the cargo or the transported container crosses the portions of the beam received by the linear arrays when the source is emitting the beam;

wherein, when the source is emitting the beam and the platform is supporting cargo or a transported container, the platform is configured to translate the cargo of the transported container completely through the portions of the beam received by the linear arrays at a first angle, and to translate the cargo or the transported container completely through the portions of the beam received by the linear arrays at a second angle; and a computer configured to receive linescan data from each of the linear arrays of the plurality of detectors, wherein the linescan data corresponds to information collected by the linear arrays from the portions of the beam when the cargo or the transported container is being translated completely through the portions of the beam at the first angle and the second angle, wherein the computer is configured to reconstruct a three-dimensional volumetric model of the cargo or the transported container by processing the linescan data from the linear arrays received when the platform translates completely through the portions of the beam at the first angle and by processing the linescan data from the linear arrays received when the platform translates completely through the portions of the beam at the second angle.

10. The imaging system of claim 9,
wherein the platform is configured to rotate so that the platform is horizontally translatable through the tunnel at multiple angles.

11. The imaging system of claim 10, wherein the source is an x-ray source and the beam is an x-ray beam.

12. The imaging system of claim 10, wherein the plurality of detectors comprises 1 to about 30 linear arrays.

13. The imaging system of claim 10, wherein the plurality of detectors comprises 3 to 9 linear arrays.

14. The imaging system of claim 10, wherein the source is configured to emit the beam with a wide vertical cone beam angle.

15. The imaging system of claim 14, wherein the wide vertical cone beam angle is in a range from approximately 20 to approximately 80 degrees from horizontal.

16. The imaging system of claim 10, wherein the linear arrays are spaced apart by an angle between approximately 3 to approximately 15 degrees relative to the source.

17. The imaging system of claim 16, wherein a total angular range over which the linear arrays extends is between approximately 10 and approximately 180 degrees.

18. A method of imaging contents, components and/or composition of cargo or transported containers by an imaging system comprising an x-ray or gamma ray source, a tunnel comprising a plurality of detectors, wherein the plurality of detectors are arranged in horizontally spaced apart linear arrays, and a translatable and rotatable platform configured to support cargo or a transported container, the method comprising:

loading cargo or a transported container onto the platform;

emitting a beam from the source, the beam being an X-ray or gamma ray beam, respectively, and covering a vertical angle;

receiving a portion of the beam at each of the linear arrays, each portion being fan-shaped and covering the vertical angle of the beam;

moving the platform through the tunnel so that the cargo or the transported container translates completely through the portions of the beam received by the linear arrays;

translating the cargo or the transported container completely through the portions of the beam received by the linear arrays at a first angle when the source is emitting the beam and the platform is supporting cargo or the transported container;

rotating the platform so that the platform is translatable through the tunnel at a second angle;

translating the cargo or the transported container completely through the portions of the beam received by the linear arrays at the second angle when the source is emitting the beam and the platform is supporting cargo or the transported container; and collecting information from the portions of the beam received by the linear arrays when the cargo or the transported container is being translated completely through the portions of the beam at the first angle and the second angle, the information pertaining to the cargo or the transported container.

19. A method of imaging contents, components and/or composition of cargo or transported containers by an imaging system comprising an x-ray or gamma ray source, a tunnel comprising a plurality of detectors, wherein the plurality of detectors are arranged in horizontally spaced apart linear arrays, a translatable and rotatable platform configured to support cargo or a transported container, and a computer, the method comprising:

loading cargo or a transported container onto the platform;

emitting a beam from the source, the beam being an X-ray or gamma ray beam, respectively, and covering a vertical angle;

receiving a portion of the beam at each of the linear arrays, each portion being fan-shaped and covering the vertical angle of the beam;

moving the platform through the tunnel so that the cargo or the transported container translates completely through the portions of the beam received by the linear arrays;

translating the cargo or the transported container completely through the portions of the beam received by the linear arrays at a first angle when the source is emitting the beam and the platform is supporting cargo or the transported container;

rotating the platform so that the platform is translatable through the tunnel at a second angle;

translating the cargo or the transported container completely through the portions of the beam received by the linear arrays at the second angle when the source is emitting the beam and the platform is supporting cargo or the transported container;

collecting information from the portions of the beam received by the linear arrays when the cargo or the transported container is being translated completely through the portions of the beam at the first angle and the second angle, the information pertaining to the cargo or the transported container;

receiving linescan data at the computer from each of the linear arrays, wherein the linescan data corresponds to the information collected from the portions of the beam when the cargo or the transported container is being translated completely through the portions of the beam at the first angle and the second angle;

reconstructing a three-dimensional volumetric model by processing the linescan data received from the linear arrays when the cargo or the transported container translates completely through the portions of the beam at the first angle and by processing the linescan data from the linear arrays when the cargo or the transported container translates completely through the portions of the beam at the second angle.

* * * * *